US010072971B2

(12) United States Patent
Dane et al.

(10) Patent No.: US 10,072,971 B2
(45) Date of Patent: Sep. 11, 2018

(54) FLEXIBLE BEAM DELIVERY SYSTEM FOR HIGH POWER LASER SYSTEMS

(75) Inventors: C. Brent Dane, Livermore, CA (US); Edward W. H. Lao, San Francisco, CA (US); Fritz B. Harris, Jr., Rocklin, CA (US); Randall L. Hurd, Tracy, CA (US); Jon Rankin, Dublin, CA (US); Scott N. Fochs, Livermore, CA (US)

(73) Assignee: METAL IMPROVEMENT COMPANY, LLC, Paramus, NJ (US)

( * ) Notice: Subject to any disclaimer, the term of this patent is extended or adjusted under 35 U.S.C. 154(b) by 1367 days.

(21) Appl. No.: 12/945,713

(22) Filed: Nov. 12, 2010

(65) Prior Publication Data

US 2011/0253690 A1    Oct. 20, 2011

Related U.S. Application Data

(60) Provisional application No. 61/342,578, filed on Apr. 16, 2010.

(51) Int. Cl.
*B23K 26/02* (2014.01)
*B23K 26/06* (2014.01)
(Continued)

(52) U.S. Cl.
CPC ............ *G01J 1/22* (2013.01); *B23K 26/0069* (2013.01); *B23K 26/043* (2013.01);
(Continued)

(58) Field of Classification Search
CPC ........ B23K 26/0639–26/0652; B23K 26/0732; B23K 26/0807; B23K 26/1417; G02B 27/0927; G02B 27/283
(Continued)

(56) References Cited

U.S. PATENT DOCUMENTS 3,724,930 A    4/1973  Farmer
3,841,760 A *  10/1974  Guyton ........................ 356/124
(Continued)

FOREIGN PATENT DOCUMENTS

| JP | 7246483 A | 9/1995 |
|---|---|---|
| KR | 20070086487 A | 8/2007 |
| WO | 2008021134 A1 | 2/2008 |

OTHER PUBLICATIONS

3M Fluorinert Liquids for Electronics Manufacturing, Product Information, Apr. 1999, 4 pages.
(Continued)

*Primary Examiner* — Sang Y Paik
(74) *Attorney, Agent, or Firm* — Haynes Beffel & Wolfeld LLP

(57) ABSTRACT

A beam delivery technology for high power laser systems, like laser peening systems, for work pieces which may have compound curvatures, includes placing an optical assembly having a receiving optic, beam formatting optics and a scanner mounted thereon, in a position to receive laser pulses from a laser source and within an operating range of the process area. Polarized laser pulses are delivered to the receiving optic while the position of the optical assembly remains unchanged. The pulses proceed through the beam formatting optics to the scanner, and are direct to respective impact areas having nominal shapes and locations on the work piece. The scanning process includes for each laser pulse, setting direction, divergence, polarization, rotation and aspect ratio of the laser pulses output from the scanner, to control the polarization, shape and location on respective impact areas.

28 Claims, 12 Drawing Sheets

(51) Int. Cl.

| | | |
|---|---|---|
| *G01J 1/22* | (2006.01) | |
| *G02B 27/09* | (2006.01) | |
| *G02B 27/28* | (2006.01) | |
| *B23K 26/00* | (2014.01) | |
| *B23K 26/04* | (2014.01) | |
| *B23K 26/073* | (2006.01) | |
| *B23K 26/08* | (2014.01) | |
| *G01J 1/04* | (2006.01) | |
| *B23K 26/082* | (2014.01) | |
| *B23K 26/70* | (2014.01) | |
| *B23K 26/146* | (2014.01) | |

(52) U.S. Cl.
CPC ...... *B23K 26/0643* (2013.01); *B23K 26/0652* (2013.01); *B23K 26/0732* (2013.01); *B23K 26/082* (2015.10); *B23K 26/0884* (2013.01); *B23K 26/146* (2015.10); *B23K 26/705* (2015.10); *G01J 1/04* (2013.01); *G02B 27/0927* (2013.01); *G02B 27/0955* (2013.01); *G02B 27/283* (2013.01); *G02B 27/0966* (2013.01)

(58) Field of Classification Search
USPC ................ 219/121.6, 121.61, 121.73–121.8
See application file for complete search history.

(56) References Cited

U.S. PATENT DOCUMENTS

| | | | |
|---|---|---|---|
| 4,174,154 A | 11/1979 | Kawasaki | |
| 4,191,928 A | 3/1980 | Emmett | |
| 4,401,477 A | 8/1983 | Clauer et al. | |
| 4,539,462 A | 9/1985 | Plankenhorn | |
| 4,621,924 A | 11/1986 | Williams | |
| 4,623,229 A | 11/1986 | Galan | |
| 4,656,433 A | 4/1987 | Franklin et al. | |
| 4,698,479 A | 10/1987 | Rando et al. | |
| 4,707,836 A | 11/1987 | Travis | |
| 4,794,222 A | 12/1988 | Funayama et al. | |
| 4,908,493 A | 3/1990 | Susemihl | |
| 4,936,649 A * | 6/1990 | Lymer et al. | 385/13 |
| 4,937,421 A | 6/1990 | Ortiz, Jr. et al. | |
| 5,022,033 A | 6/1991 | Hackell | |
| 5,075,893 A | 12/1991 | Epstein et al. | |
| 5,118,918 A | 6/1992 | Serrano | |
| 5,127,019 A | 6/1992 | Epstein et al. | |
| 5,131,957 A | 7/1992 | Epstein et al. | |
| 5,132,887 A | 7/1992 | Torii et al. | |
| 5,142,118 A | 8/1992 | Schlatter | |
| 5,239,408 A | 8/1993 | Hackel et al. | |
| 5,332,881 A | 7/1994 | Topkaya et al. | |
| 5,382,770 A | 1/1995 | Black et al. | |
| 5,384,803 A | 1/1995 | Lai | |
| 5,449,879 A | 9/1995 | Lawson et al. | |
| 5,525,429 A | 6/1996 | Mannava et al. | |
| 5,569,018 A | 10/1996 | Mannava et al. | |
| 5,571,575 A | 11/1996 | Takayanagi | |
| 5,624,436 A * | 4/1997 | Nakamura et al. | 606/12 |
| 5,670,069 A | 9/1997 | Nakai et al. | |
| 5,674,328 A | 10/1997 | Mannava et al. | |
| 5,674,329 A | 10/1997 | Mannava et al. | |
| 5,689,363 A | 11/1997 | Dane et al. | |
| 5,741,559 A | 4/1998 | Dulaney | |
| 5,986,234 A | 11/1999 | Matthews et al. | |
| 5,986,236 A | 11/1999 | Gainand et al. | |
| 6,072,149 A | 6/2000 | Maruyama et al. | |
| 6,127,649 A | 10/2000 | Toller et al. | |
| 6,198,069 B1 | 3/2001 | Hackel et al. | |
| 6,215,097 B1 | 4/2001 | Mannava | |
| 6,259,055 B1 | 7/2001 | Sokol et al. | |
| 6,288,358 B1 | 9/2001 | Dulaney et al. | |
| 6,384,371 B1 | 5/2002 | Hinei et al. | |
| 6,409,718 B1 * | 6/2002 | Tang | 606/5 |
| 6,410,884 B1 | 6/2002 | Hackel et al. | |
| 6,462,301 B1 | 10/2002 | Scott et al. | |
| 6,528,763 B1 | 3/2003 | Lahram et al. | |
| 6,657,160 B2 | 12/2003 | Hackel et al. | |
| 6,747,241 B2 | 6/2004 | Shikoda et al. | |
| 6,867,390 B2 | 3/2005 | Clauer et al. | |
| 7,109,436 B2 | 9/2006 | Even et al. | |
| 7,435,927 B2 * | 10/2008 | Bruland et al. | 219/121.69 |
| 7,718,921 B2 | 5/2010 | Dane et al. | |
| 7,880,117 B2 * | 2/2011 | Li et al. | 219/121.7 |
| 2002/0096503 A1 | 7/2002 | Hackel et al. | |
| 2003/0217997 A1 | 11/2003 | Clauer et al. | |
| 2005/0006361 A1 | 1/2005 | Kobayashi et al. | |
| 2005/0045598 A1 | 3/2005 | Even et al. | |
| 2005/0056626 A1 | 3/2005 | Gross et al. | |
| 2006/0102602 A1 | 5/2006 | Dane et al. | |
| 2006/0102604 A1 | 5/2006 | Dane et al. | |
| 2006/0102609 A1 * | 5/2006 | Dane et al. | 219/121.85 |
| 2007/0193984 A1 | 8/2007 | Kawai et al. | |
| 2008/0110869 A1 | 5/2008 | Chen | |

OTHER PUBLICATIONS

Auerbach, J.M., etal., "Diode-pumped monolithic Nd:YLF 1.053 :m mini-laser and its application to injection seeding, "Solid State Lasers SPIE 1223 (1990) 133-141.

Crofts, G.J., et al., "Experimental and theoretical investigation of two-cell stimulated-Brillouin-scattering systems," J. Opt. Soc. Am. B, vol. 8, No. 11, Nov. 1991, 2282-2288.

Dane, C.B., et al., "Design and Operation of a 150 W Near Diffraction-Limited Laser Amplifier with SBS Wavefront Correction," IEEE Journal of Quantum Electronics 31(1) (Jan. 1995), 148-163.

Fairland, B.P., et al., "Laser shock-induced microstructural and mechanical property changes in 7075 aluminum," J. Appl. Phys., vol. 43, No. 9, Sep. 1972, 3893-3895.

Hanna, D.C., et al., "Single Axial Mode Operation of a Q-Switched Nd:YAG Oscillator by Injection Seeding," IEEE Journal of Quantum Electronics 20(2) (Feb. 1984), 117-125.

Park, Y.K., et al., "Electronic Linewidth Narrowing Method for Single Axial Mode Operation of Q-Switched Nd:YAG Lasers," Optics Communications 37(6) (Jun. 15, 1981), 411-416.

ISR dated Oct. 25, 2011 in PCT/US2011/026954.

ISR dated Dec. 27, 2011 in PCT/US2011/026949.

Park et al. Single Axial Mode Operation of a Q-Switched Nd:YAG Oscillator by Injection Seeding, IEEE Journal of Quantum Electronics 20(2) (Feb. 1984), 117-125.

Hanna, et al. Single longitudinal mode selection of high power actively Q-switched lasers, Opto-electronics 4, Jul. 5, 1972, pp. 249-256.

European Search Report from Application No. 11769234.3 dated Oct. 1, 2013, 5 pages.

* cited by examiner

*325mm separation*
*3.2% distortion*

*275mm separation*
*~0% distortion*

*225mm separation*
*-4.0% distortion*

FLEXIBLE BEAM DELIVERY SYSTEM FOR HIGH POWER LASER SYSTEMS

The benefit of U.S. Provisional Application No. 61/342,578, filed 16 Apr. 2010, entitled DUAL GIMBAL STINGER MOVING BEAM SYSTEM is hereby claimed.

BACKGROUND OF THE INVENTION

Field of the Invention

The present invention relates to high energy laser systems, to beam delivery systems, and to laser peening systems suitable for use with stationary targets.

Description of Related Art

The use of mechanical shocks to form metals and to improve their surface properties has been realized for ages. In current industrial practice, a peening treatment of metal surfaces is most often accomplished by using high velocity shot. Treatment improves surface properties and, very importantly for many applications, results in a part displaying significantly improved resistance to fatigue and corrosion failure. A wide range of work pieces are shot peened in the aerospace and automotive industries. However, for many applications, shot peening does not provide sufficiently intense or deep treatment, does not provide sufficient control of intensity or depth, or cannot be used because of its detrimental effect on the surface finish.

With the invention of the laser, it was rapidly recognized that the intense shocks required for peening could be achieved by means of a laser-driven, tamped plasma. B. P. Fairand, et al., "Laser Shot Induced Microstructural and Mechanical Property Changes in 7075 Aluminum," *Journal of Applied Physics*, Vol. 43, No. 9, p. 3893, September 1972. Typically, a plasma shock of 10 kB to 30 kB is generated at metal surfaces by means of high energy density (about 200 $J/cm^2$), short pulse length (10-30 nanoseconds) lasers. A thin layer of metal tape, black paint or other absorbing material on the metal surface is sometimes used to provide an absorber to prevent ablation of the metal. A confining or tamping material such as water covers the surface layer providing an increased intensity shock. These shocks have been shown to impart compressive stresses, deeper and more intense, than standard shot peening. In testing, this treatment has been shown to be superior for strengthening work pieces from fatigue and corrosion failure. Laser peening is also used for forming and texturing surfaces.

One laser system which has been utilized for this purpose is described in our prior U.S. Pat. No. 5,239,408, entitled HIGH POWER, HIGH BEAM QUALITY REGENERATIVE AMPLIFIER. The laser system described in the just cited '408 patent comprises a high power amplifier in a master oscillator/power amplifier MOPA configuration capable of producing output pulses greater than 20 Joules per pulse with the pulse width on the order of 10 to 30 nanoseconds or less using a wavefront correcting configuration based on a stimulated Brillouin scattering (SBS) phase conjugator/mirror system.

In most commercial high energy laser peening processes, the laser beam position is held at a fixed location. The work piece being treated is moved relative to the laser beam line to create the applied spot pattern while maintaining the desired incidence angles, spot sizes, and orientations. This requires automation and work piece holding fixtures to grip the work piece and move it through its programmed positions. This method becomes both costly and highly work piece specific, requiring considerable engineering to develop processes for new work pieces. In addition, work piece size is limited to the lifting and handling capacity of the automation utilized. Work pieces and structures larger than automation handling capacity (for example, >1 m and/or >100 kg) cannot be laser peened by the conventional work piece moving approach.

Flexible beam delivery systems are often based on the use of optical fibers. However, even at wavelengths where glass fiber transmission is normally high, the very high pulse energy and high peak power used in laser peening can damage the fibers and render them ineffective. For example, a 25 J pulse is 100 times the maximum pulse energy (250 mJ) that can be delivered through a 1 mm multi-mode fiber. For single frequency beams, such as used in representative laser peening applications, glass fibers have even lower damage thresholds. U.S. Pat. No. 7,718,921, entitled ACTIVE BEAM DELIVERY SYSTEM WITH VARIABLE OPTICAL PATH SEGMENT THROUGH AIR, by Dane et al. (published 18 May 2006, as US 2006/0102602 A1) describes a flexible beam delivery system utilized for laser peening in industrial settings, where the target can be stationary while the laser pulses needed for laser peening are delivered with precision to the surface.

The system of the '921 Patent uses a transmitter mirror in a gimbal mount which directs the output beam across a free air path to a laser delivery tool that comprises an optical assembly (referred to herein as the "stinger") which is held by an industrial robot. A receiver gimbal on the stinger keeps the laser beam aligned to the optical axis of the stinger, allowing the process robot to point and scan the stinger across the surface of the work piece, generating a well-defined pattern of laser peening spots. This has been a successful system in operation, used to process components such as engine fan blades for commercial aviation, steam turbine blades for power generation, and large blisks for aircraft. However, there are a number of disadvantages to its design, including for example:

1. The pointing accuracy of the stinger depends on the absolute accuracy of the robot axes; particularly the axes in the robot wrist. This often results in errors in the spot pattern placement that must be manually corrected in a process that requires multiple iterations and can take hours, days, or even weeks in some instances. Fortunately, once the pattern is established, the robot motion is very consistent, usually making it unnecessary to repeat this alignment exercise so long at the work piece and robot remain stationary.
2. The robot must reposition the stinger on every laser pulse to point to a new spot on the work piece, making the pulse repetition frequency (PRF) limited by the speed of the robot motion. The idea of applying more than one pulse for each stinger position is mentioned in the '921 Patent at column 11, line 48-column 12, line 12. However, the effectiveness of the approach mentioned there was limited by the small scanning range available, and would not be effective for complex surfaces.
3. There is no aspect ratio control to correct for spot elongation during off-axis peening. This means that non-normal beam incidence results in a rectangular (instead of square) spot shape which can have an aspect ratio as high as 3:1 near an incidence angle of 70 degrees (measured from the surface normal). For small spot areas this can result in a narrow beam foot print. Since peening efficiency is better for larger spot dimensions that create a flatter wave front for the shock wave induced in the metal, the narrow beam foot print reduces peening efficiency.

4. Active robot motion in the near proximity of a very valuable work piece can increase the possibility of a robot collision and damage to a customer part.
5. The stand-off distance between the final optic of the stinger and the treatment plane needs to be kept as short as possible to minimize the amount of robot motion required to hit different non-parallel surfaces on the work piece at near normal incidence.
6. The calibration of the energy and beam profile diagnostics built into the stinger is very sensitive to beam depolarization in the beam delivery path between the laser output and the stinger.
7. There is limited polarization control. In the '921 Patent, the beam polarization was fixed with respect to stinger orientation. A 90° quart rotator that can be moved in and out of the output beam by a pneumatic stage was used in later systems, but the polarization still could not be set to an arbitrary angle with respect to the work piece. This is particularly important for off-axis peening where reflections from the surface of the tamping water flow could result in significant loss of power that could be translated into the peening shock wave.
8. The diagnostic beam splitters on the stinger are susceptible to the generation of weak optical ghosts which can cause spurious signals on alignment cameras and the energy meter.
9. The stinger in industrial applications used a conventional mechanical design with a solid aluminum breadboard and optical components held with standard off-the-shelf mounts. This results in a heavy assembly which exceeded the recommended load capacity of the processing robot holding the stinger.
10. An unsealed optical enclosure on the stinger lead to frequent contamination of optical surfaces. This increased the need for routine inspection and cleaning of the optical components since dust and debris on optical surfaces can lead to catastrophic laser damage.

In one adaptation of the system of the '921 Patent, has been used to laser peen form relatively flat panels. The flat panel system was a fixed processing cell that scanned the laser peening pulses over process areas of up to 48×48 in$^2$ from a single receiver gimbal position on the stinger. This flat panel system used a scanning mirror installed on a motorized gimbal mount to move the spot across the treatment area. Using a single gimbal position encounters problems because of the range of angles of incidence in the process area as the beam scanned over the area 4 feet on a side. Thus, for the panel forming process, the challenge to overcome was how to maintain correctly located, rotated, shaped, and sized spots, independent of location on the panel.

Since the laser beam is converging on its way to the surface of the work piece, increasing propagation distance as the beam is pointed away from the center of the panel causes it to shrink. Non-normal angles of incidence cause the beam to elongate on the surface along the plane of incidence. Finally, if the plane of incidence on the scanning gimbal is not orthogonal to the square beam, spot rotation on the surface of the work piece will result.

To overcome these distortions, the flat panel system used a zoom telescope to adjust the beam divergence angle and a tilting telescope lens to pre-adjust the aspect ratio. A field-rotator was used to rotate the beam profile on target to compensate for out-of-plane gimbal mirror reflections. This allows a uniform pattern of square spots to be accurately placed on the work piece, as illustrated with respect to an example process field with reference to FIGS. 1(a) to 1(e).

FIG. 1(a) shows spot locations A through I which correspond to different locations in a field, where E is the normal incidence, center spot which is a square. A converging laser beam is directed across a 48" square treatment field from a stationary gimbal location 66" from the work surface. The corner spots A, C, I and G are 74.2" from the gimbal. The spots B, F, H and D on the sides are 70.2" from the work surface. With no corrections, the increased propagation distance and off-normal angles away from center would produce the spot shapes and sizes shown in FIG. (b). Rotating the spots using field rotator in advance of the gimbal, yields the symmetrical pattern shown in FIG. 1(c). By adjusting the output divergence using the zoom telescope, the spot areas can be made to have equal area as shown in FIG. 1(d). Finally, by tilting a zoom lens element, the relative horizontal and vertical divergence is controlled to generate the uniform pattern of spots as shown in FIG. 1(e). The flat panel system was suitable for delivering pulses across a large essentially flat process area, with relatively small range of angles of incidence on the panel for the spots in the pattern. However, it does not address the problems outlined above for implementation of a versatile system usable with complex surface geometries encountered in industrial laser peening systems.

It is desirable to provide a system that provides sufficient flexibility to be able to treat large work pieces and work pieces "in situ" at customer facilities, like aircraft or aircraft parts at an aviation repair station or large oil drilling work pieces at a pipe yard, and systems that overcome one or more of the problems outlined above.

SUMMARY OF THE INVENTION

A beam delivery system and method are described to enable delivery of high power laser energy with precisely controlled impact areas and polarization over one or more target surfaces on work pieces, where the target surfaces may or may not lie in a single plane and each of which may have single or compound curvatures (i.e. non-planar surfaces having curvatures in more than one dimension). For example, laser energy can be delivered to a process area which may have compound curvatures on a target surface of the work piece by a process that includes placing an optical assembly (referred to as a "stinger" herein) having a receiving optic, beam formatting optics and a scanner mounted thereon, in a position to receive laser energy from a laser source. While the position of the stinger remains unchanged, laser energy is delivered to the receiving optic and directed using a scanner to impact areas having nominal shapes and locations in the process area according to a pattern. For each location in the process area, the beam delivery technology described herein enables the setting of direction, divergence, polarization, field rotation, and aspect ratio of the laser energy output from the scanner, to control the polarization shape and location of the laser energy on the respective impact areas. For processes like laser peening, laser energy comprises a plurality of laser pulses that are distributed over an array of impact areas arranged adjacent to one another within a process tolerance. The nominal shapes and the impact areas for the plurality of laser pulses in the process area are uniform and square or rectangular. The beam delivery technology described herein enables the delivery of the laser pulses so that the actual impact areas are aligned within process tolerances and maintain the desired square or rectangular shape.

Technology is described for calibrating a controller that controls the optical components in the stinger to direct the laser energy to the process area. For a given position of the stinger, as result of the calibration, calibrated parameters for direction, divergence, polarization, field rotation, and aspect ratio are provided for each impact area in the pattern. The calibration process can include aligning a tracer beam with registration marks on the work piece using a camera mounted on the stinger. Then settings derived from that aligning process are used to define a geometry for the work piece, and translating the geometry to the calibrated parameters.

In an embodiment described herein, the source of the laser energy comprises a reflecting optic, such as a mirror, which is adjustable to direct the laser energy to the receiving optic on the stinger. The assembly including this optic and its means for adjustment are referred to as the optical transmitter. In this embodiment, the receiving optic comprises a receiving mirror which is adjustable in coordination with the optical transmitter to reflect laser energy on optical path segment with a controllable polarization component, a controllable aspect ratio component, a controllable divergence component and the scanner on the stinger.

For embodiments in which polarization of the output beam can be important, the impact areas are characterized by a processor using nominal surface normal vectors, and the polarization is controlled by rotating the polarization of the beam in the stinger so that the laser energy has the P-polarization for the nominal surface normal vectors for the corresponding impact areas.

The technology is described supporting delivery of laser energy to impact areas in a pattern for a work piece having surfaces that are characterized by nominal surface normal vectors inclined relative to the line from the scanner, wherein the inclines of the nominal surface normal vectors for at least two impact areas in the process area serviced by a single position of the stinger, differ by up to 60 degrees, and in some embodiments 90 degrees or more.

In addition, technology is described for sensing power of polarized laser energy delivered to the stinger in a manner that utilizes polarization independent beam splitters.

An apparatus is described for delivering laser energy. The apparatus includes a stinger mounted on a robot or other mount used for maintaining or establishing position of the stinger, where the stinger includes a receiving optic, beam formatting optics and a scanner such as described above. The apparatus includes a laser system adapted to produce laser energy along with a beam delivery system to direct the laser energy from the laser system to the receiving optic on the stinger. A rotation controller in the optical path between the laser system in the scanner is controllable to adjust the field rotation of the laser energy from spot to spot. Also, a control system is included and is coupled to the laser system, the robot, the stinger and the beam delivery system, and programmed to place the stinger a position to receive laser energy from the laser system via the beam delivery system, and while the position of the stinger remains unchanged, to direct the laser energy using the scanner to impact areas having nominal shapes and locations in the process area according to a pattern. For each impact area in the pattern, the controller can set the direction, divergence, polarization, rotation and aspect ratio of the laser energy output from the scanner so that the polarization, shape and location of the laser energy on the respective impact areas are controlled.

Other aspects and advantages of the beam delivery system can be seen on review of the drawings, the detailed description and the claims, which follow.

DETAILED DESCRIPTION

A detailed description of embodiments of the present invention is provided with reference to the FIGS. 1-16.

A moving beam delivery system is described that minimizes robot motion during laser peening. The moving beam system provides a tool that can be used across a wide range of production processes, including but not limited to laser coating removal, laser heat treating, and laser peening.

Using a moving beam delivery system like that represented by the embodiments described here, a significant portion of a laser peening pattern can be applied across a work piece having compound surfaces from a single stinger/robot position; laser spot size, spot rotation, aspect ratio, and divergence corrections to place square (or low aspect ratio rectangles) impact areas across a process area on a treatment surface of a known complex shape; the laser repetition frequency can be increased by replacing robot motion for each laser spot with high speed optical adjustments and gimbal mirror beam scanning; accurate pattern registration methods can be incorporated that use the actual laser beam (tracer) and can be completed in minutes; the capability of operating the stinger from a fixed location (or on a simple linear stage) which can in some cases eliminate the need for a robot manipulator; continuously adjustable polarization control at the work piece can be provided; depolarization correction can be implemented in the stinger diagnostics, improving energy calibration and near field imaging; the number of optical ghosts in the tracer beam detection and energy meter systems can be reduced; the overall weight of the stinger assembly can be reduced and beam formatting optics can be sealed against outside contamination.

Figure 1:
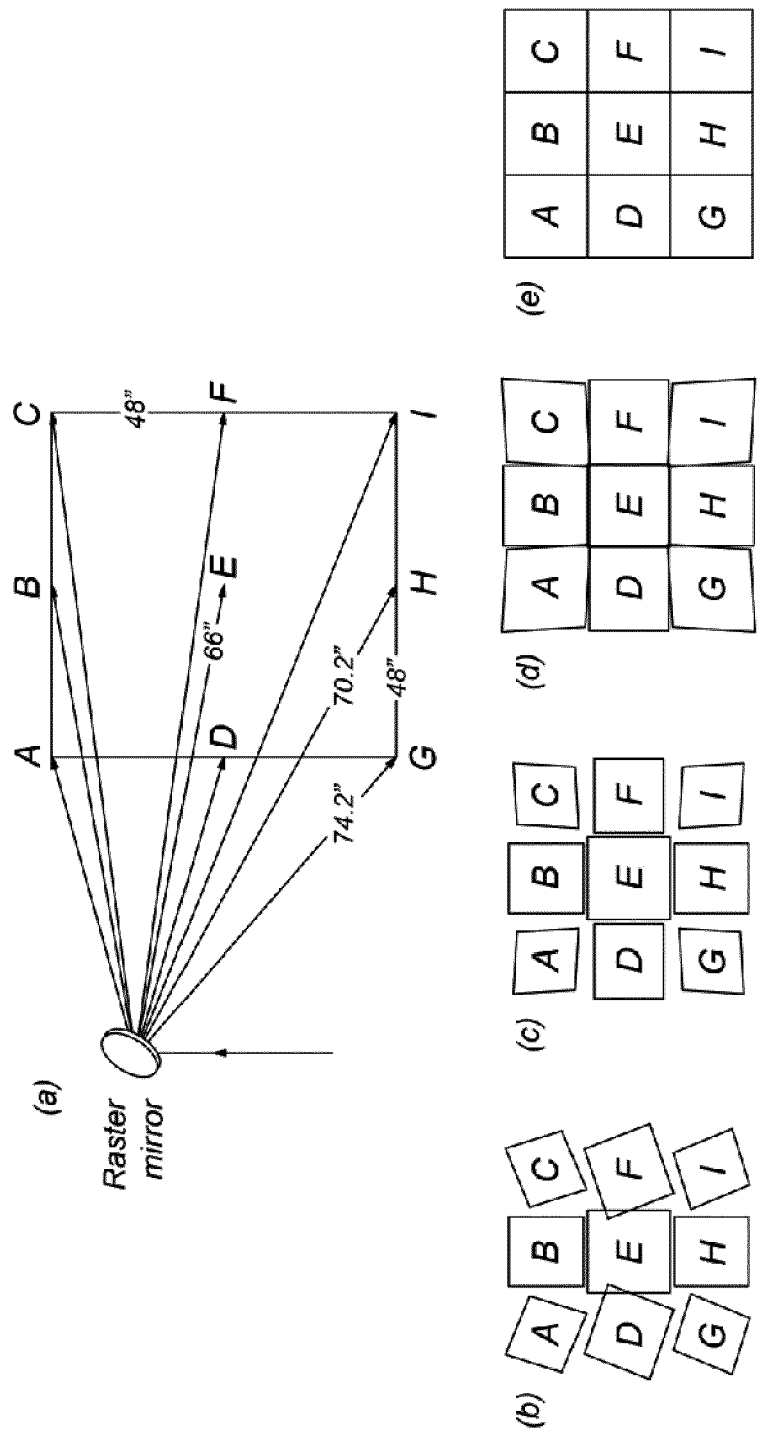
FIG. 1 illustrates spot distortions arising from using a raster mirror to deliver laser pulses to a flat surface, and corrections for the distortions.
Figure 2:
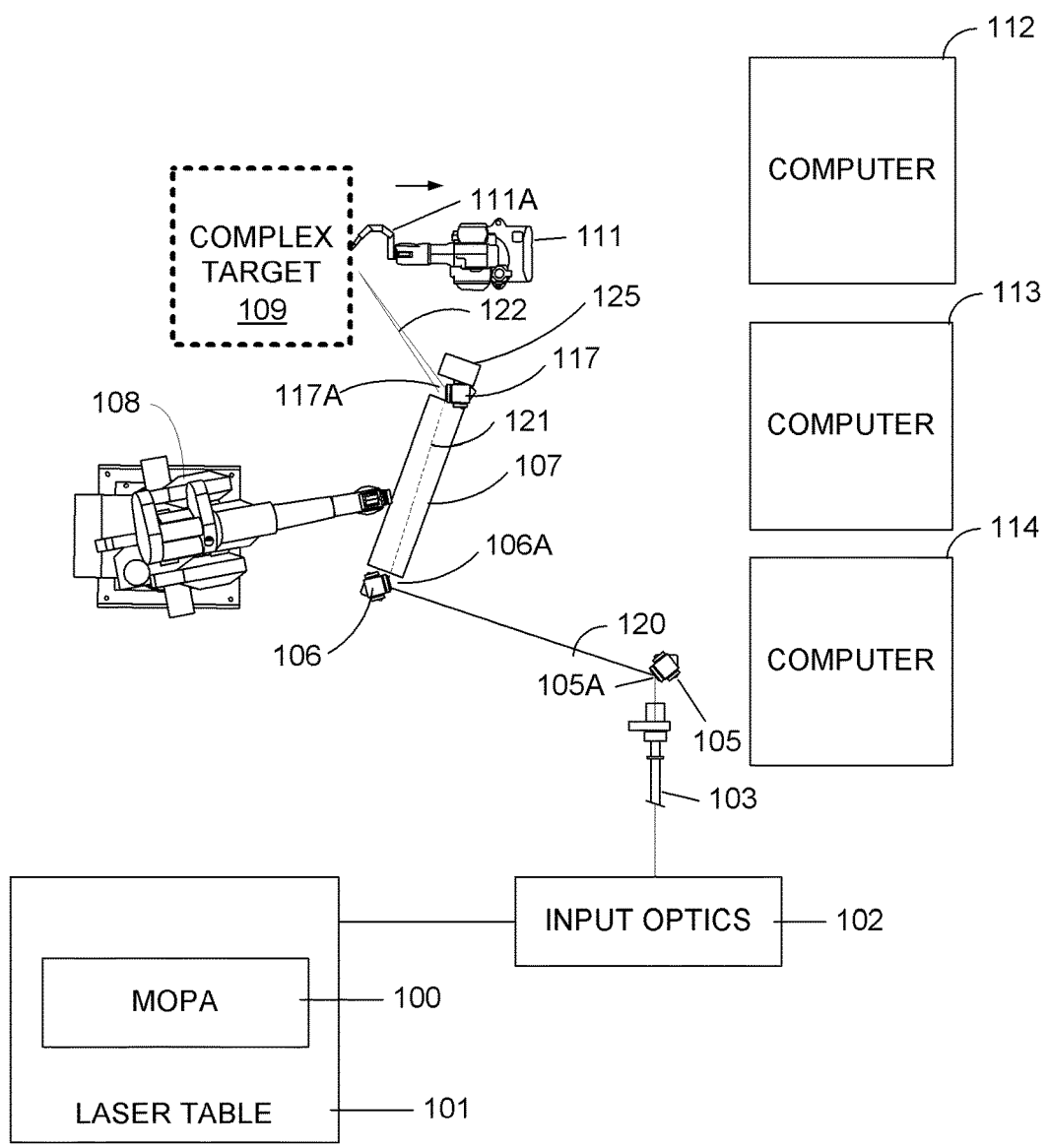
FIG. 2 is a diagram of a laser beam delivery system as described herein configured for laser peening a work piece.

FIG. 2 shows a schematic of a laser peening system. This is not meant to be a scale design of an actual system but illustrates basic components and their layout. The system of FIG. 2 includes a laser 100 in a master oscillator/power amplifier configuration, such as described in the '921 Patent incorporated by reference above, or other laser energy source, which provides polarized, single frequency output pulses in preferred systems. The laser 100 is mounted on a stable laser table 101. Output from the source of laser energy is applied to input optics 102 which can include components to condition the beam for delivery through a relay telescope 103 to a transmitting mirror 105A mounted on transmitting mirror gimbal 105. Other optical transmitters could be used as well. The transmitting mirror 105A under precision control reflects the beam to a receiving mirror 106A (or other optic) mounted on receiving mirror gimbal 106 on the stinger, which is likewise operated under precision control. The receiving mirror 106A on receiving mirror gimbal 106 is part of a robot mounted stinger 107, which is in turn positioned by robot 108, which can be a precision robot having for example 7 degrees of precision position control. The stinger 107 includes beam formatting and diagnostic components in a sealed housing through which the beam is directed to a scanner, implemented in this example by a scanner optic 117A (such as a mirror) mounted on precision controlled gimbal 117 on the stinger, for directing the beam to a target location on a surface of a work piece 109. In this embodiment, the work piece 109 can be part of a large manufactured item, such as an airplane wing or other large machine, and can include process areas with compound surfaces. The robot 108 can be mounted on a transportable pallet with air bearings, for example, in order to be positioned within an operating range of the work piece. Alternatively, work pieces can be mounted on a rotatable parts holder, or otherwise placed near the robot 108 for processing. The stingers 107 in embodiments described herein include raster optics which support directing laser pulses over an array of locations, while the stinger 107 remains in a fixed position. Positioning the stinger for application of laser pulses to targets is facilitated by the range of output directions that can be achieved. In some settings, the stinger configured as described here may be mounted on an X-Y stage, with or without vertical movement mechanisms, rather than complex robots with 7 degrees of motion, supporting moving of the stinger 107 over an predetermined area. Other stinger positioning systems can be deployed, as suits a particular installation, which act as mounts for the stinger to maintain precision positioning coordination with the laser system transmitter optics.

A water delivery robot 111 is likewise placed near the work piece 109, and includes a vessel 111A for delivery of tamping fluid in the laser peening application. The robot 111 in embodiments of the technology can also control placement of a coordinate measuring metrology touch probe (such as the Renishaw style) if desired, for use during laser peening operations. The water delivery robot 111 is used to deliver the transparent tamping layer to the surface of the treated part. An alternative system integrates a water delivery vessel on to the robot 108 along with the robot mounted stinger 107.

A control system in this example includes computers configured as a controller 112 for the robot 111, a controller 113 for the robot 108, and a controller 114 for coordinating operation of the robots and adjustable components in the beam delivery system and in the laser 100, and other controllable components are provided with the system. The control system can be implemented using one or more program controlled processors, having numerical control programs and other programs for calibrating and positioning the robots, and for calibrating and controlling the optical components based on 3D computer-aided-design CAD models of the work pieces and positioning space of the robots and so on.

The basic optical path from the input optics 102 to the target work piece can be understood with reference to three major turns in this embodiment, all of which are controlled using optics on high-speed, high-resolution gimbals. The optical path includes a segment 120, between the transmitting mirror 105A and the receiving mirror 106A, which is essentially straight and has a variable length through air, and a variable direction defined by the angle setting of the transmitting mirror gimbal. The variable length is controlled by the robot 108 based on the positioning of the stinger 107. Likewise, the variable direction is set using the gimbals 105, 106 according to the positioning of the stinger 107. In the embodiment illustrated, the segment 120 extends through free air, that is, without an enclosure such as a tube. In other embodiments, a telescoping tube or other enclosure could be provided so long as it is sufficiently adjustable. The optical path also includes a second segment 121 from the receiving optic 106A to the scanner optic 117A through the beam formatting and diagnostic components in the housing for the stinger 107. The optical path includes a final segment 122 from the scanner optic 117A to the target surface. An image sensor 125, such as a camera, is mounted adjacent the scanner optic, and arranged to provide an image of the target near the location of the impact area to be hit by a given setting of the optical components. The sensor 125 can be used for calibration of the system for complex target surfaces as described below.

A process chamber could be implemented, including an access door for technicians, a parts access door which allows access to a parts holder, and a shutter for admitting the laser radiation. A process chamber allows provision of a controlled environment for the operation of the robot 108. The process chamber can be mounted on a platform, such as a foundation or movable plank, and the transmitting mirror gimbal 105, robot 108 with the robot mounted stinger 107, the robot 111 and parts holder can all be mounted thereon in a fixed spatial relationship. The laser 100 and input optics 102 are mounted on separate stages, which can be closely coupled with the process chamber. The telescopes in the input optics 102 can be configured to provide hundreds of feet of beam propagation between the laser table 101 and the process chamber if required by space restraints in the immediate area of the process chamber.

Figure 4:
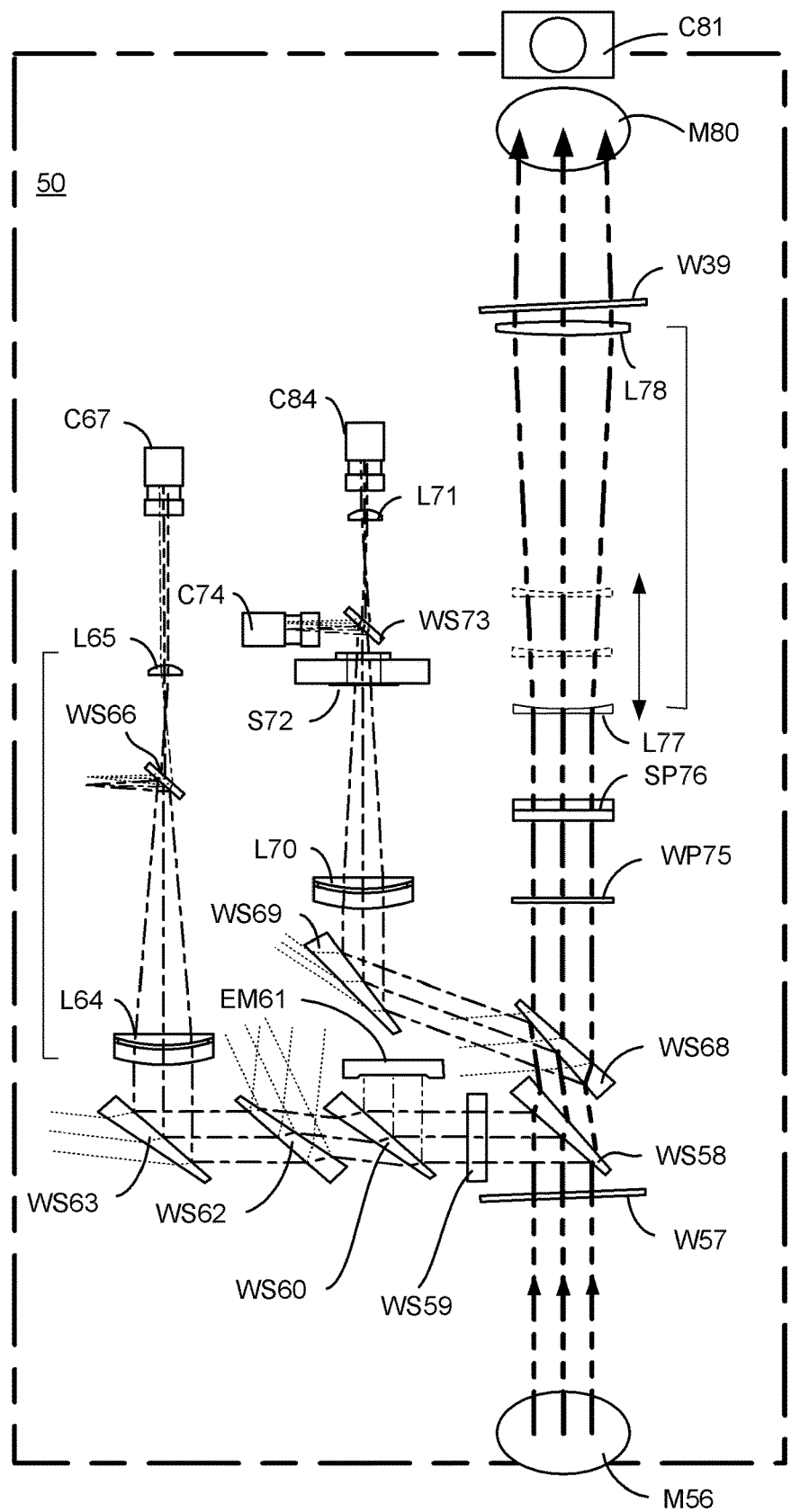
FIG. 4 is a diagram of a robot mounted stinger, including a receiving mirror, beam formatting optics and diagnostic components for use in cooperation with the system of FIG. 3.

FIG. 4 illustrates the basic configuration of the dual gimbal stinger (DGS). Like the previous moving beam system, it uses a transmitter gimbal to deliver the high energy laser beam across a free air path to a receiver gimbal on the stinger which is held by a processing robot. A closed loop control system uses a low power, continuous-wave (CW) tracer beam that is precisely co-aligned with the high energy pulsed beam to maintain accurate alignment through the stinger. As shown in FIG. 4, the DGS adds a second gimbal on the output of the stinger, allowing the beam to be scanned across a treatment surface from a fixed stinger location. Formatting optics contained in the stinger correct the beam divergence, beam shape, and polarization to achieve a uniform pattern of square spots across the work piece. Also contained in the DGS are diagnostic sensors to measure the beam profile and the laser pulse energy.

The process robot holding the DGS is mounted on a pallet equipped with air bearings which allow it to be easily moved to different locations in the work cell, as needed. As mentioned above, other DGS mount technology can be used as well.

Figure 3:
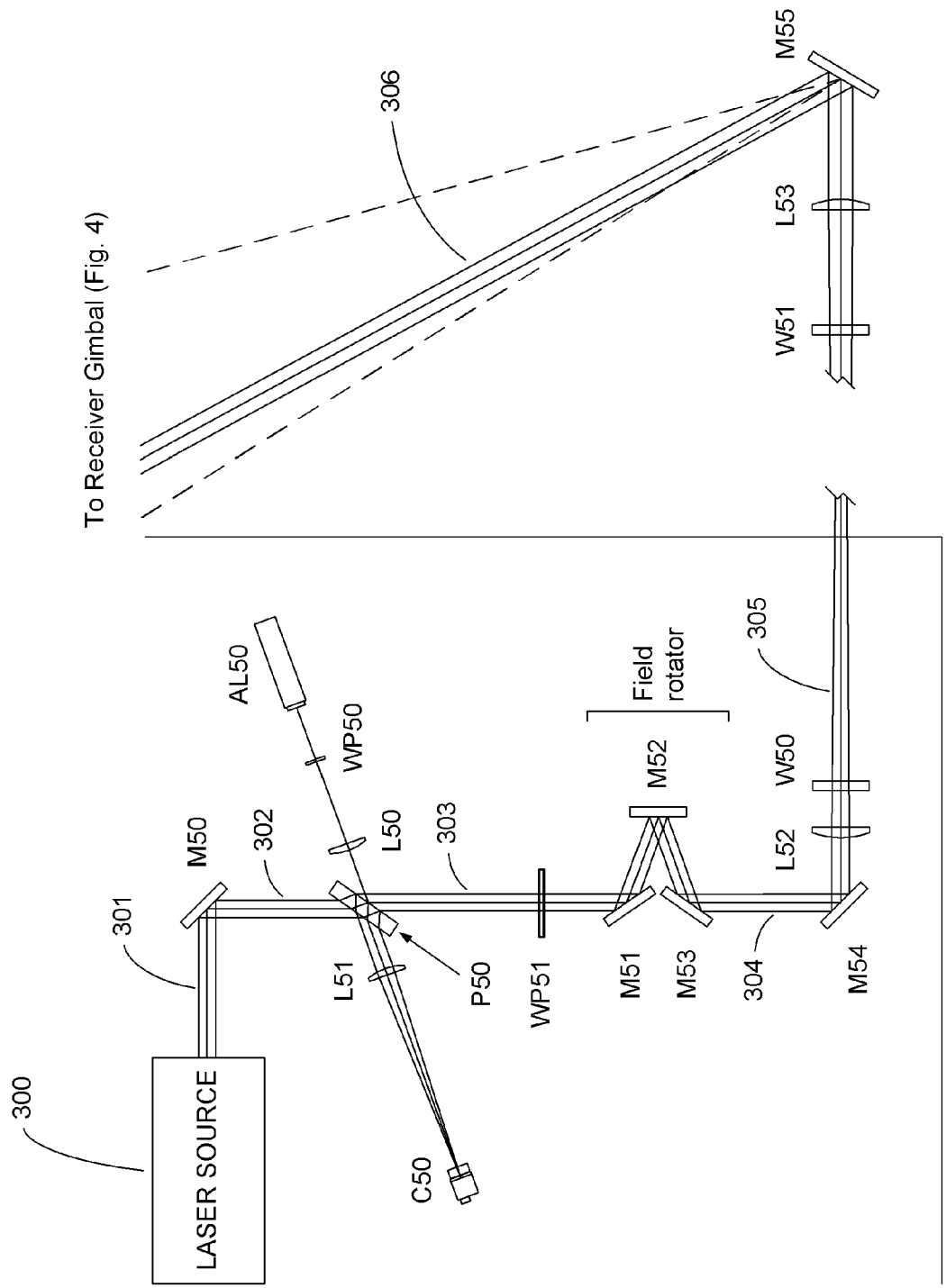
FIG. 3 is a diagram of input optics and a transmitting mirror for energy delivery systems like those of FIG. 2.

FIG. 3 illustrates a layout for input optics up to transmitting mirror, labeled M55 in FIG. 3, which corresponds to the transmitting mirror 105A in FIG. 2. Laser source 300 provides an output beam on line 301 defining a first segment of the optical path. The output beam can be square in cross-section and polarized. Mirror M50 reflects the beam on line 302 defining a second segment of the optical path to active alignment optics which comprise alignment laser AL50, half wave plate WP50, lens L50, polarizer P50, lens L51 and camera C50. The beam which propagates through the polarizer P50 proceeds on a third segment of the optical path along line 303 through wave plate WP51 to field rotator optics which comprise mirror M51, mirror M52 and mirror M53. From mirror M53, the beam as rotated propagates on a fourth segment of the optical path on line 304 to mirror M54. Mirror M54 turns the beam through a beam transport telescope (also called relay telescope) which comprises lens L52 and lens L53, on a fifth segment of the optical path along line 305 to the gimbal-mounted transmitting mirror M55. Windows W50 and W51 define the input and output of a vacuum chamber (not shown) for the telescope, in which the beam is brought through a focus. The transmitting mirror M55 turns the beam on a variable angle along a sixth segment of the optical path on line 306, which is directed at the receiving mirror on the robot mounted stinger as described above, through a variable length of air.

The alignment laser AL50 in one embodiment comprises a continuous-wave (CW, i.e. non-pulsed) laser to verify correct alignment, to enable feedback adjustments to the alignment in between laser shots and for calibration processes described below. The output of this laser is referred to as the tracer beam. In one embodiment, the alignment laser AL50 comprises a diode-pumped Nd:YLF laser which produces relatively low output power (<500 mW). The alignment laser AL50 has the same or similar wavelength as the peening laser source 300, or is otherwise configured so that the reflecting and focusing properties of the alignment beam through all of the optics can be reliably used for alignment of the high power beam.

The divergent output from alignment laser AL50 (<500 mW) is collimated by lens L50 and combined with the high power beam path at polarizing beam splitter P50. Using half waveplate WP50, the polarization of the alignment laser is set to S-polarization so that it reflects at the polarizer on the beam line 303. A small portion of the high power beam transmitted in P-polarization is reflected at the polarizer P50, and a small portion of the alignment beam is transmitted through polarizer P50 to the camera C50. Diagnostic camera C50 detects the positions of the alignment and high power beams, and provides feedback for achieving precise co-alignment. The camera is placed at the focus of lens L51. When the far field (focal point) of the small leakage of the high power beam reflected from the surface of polarizer P50 precisely overlaps the focal point of a portion of the alignment beam that transmits through the polarizer P50, then co-alignment is confirmed. Waveplate WP50 can be rotated to allow the fraction of alignment beam transmission through the polarizer P50 to be adjusted.

Rotation of the cross-section of the beam that results from beam path 305 in FIG. 3 being non-parallel to the beam path between M56 and M80 in FIG. 4 is compensated in the field rotator optics. For example, in a laser peening system, a square beam cross-section, or other rectangular shape, is preferred. Depending on the relative angle between the plane containing the incident and reflected beams on the gimbal-mounted transmitting mirror M55 and the plane containing the incident and reflected beams on the gimbal-mounted receiving mirror M56 (mirror M56 is shown in FIG. 4), the square beam will be rotated with respect to the coordinates of the robot mounted stinger. The field rotator optics pre-rotate the beam cross-section so that the desired spot orientation is delivered to the target surface. The field rotator optics consist of three mirrors M51-53 which are rigidly mounted on a common structure which can rotate around the input beam axis using a remotely controlled rotational stage. Since there is an odd number of reflections (3), rotating this three mirror assembly will cause the square beam to rotate at 2× the rate, i.e. a 45 degree mirror assembly rotation will cause a full 90 degree beam rotation. In the case of a square beam, a ±22.5 degree rotation of the field rotator will provide all required beam orientations. Other optical arrangements can be utilized for providing field rotation. As the field rotation elements are relatively large, it is preferable that they be mounted in the input optics rather than in the stinger on the robot. However, in other embodiments, the field rotation elements can be placed in other locations on the beam line.

It is desirable for the input beam polarization to the DGS be P-polarized to minimize the optical losses from beam-splitters WS58 and WS68 in FIG. 4. Polarization rotator WP51 in FIG. 3 is used to adjust the beam polarization angle, independent of the field rotation angle to preserve P-polarization at WS58, regardless of the orientation of the square beam at that point in the optical system.

The transport telescope, formed from lenses L52 and L53, serves to enlarge the square beam and to relay an optical image across the free-propagation path to the processing head comprising the robot mounted stinger. Through this telescope, the beam is magnified in one embodiment by about 1.4× from a nominal dimension of 23 mm square to 32.5 mm. This has three functions. The first is that the beam area is increased by 2× on the transmitter and receiver mirrors, lessening the risk of optical damage. The second function is that the relay distance of the telescope is increased by the magnification squared (i.e. 2×) making it possible to provide a well defined beam image at the distant treatment plane. Finally, magnifying the beam increases the Raleigh range (defined as twice the confocal parameter) by 2× with a 1.4 times magnification, improving the free-space propagation characteristics of the beam. This third function is important since the optical relay telescope and the beam delivery telescope in the processing head have been optimized for a single propagation distance. However, as the processing head is maneuvered within a ±45 degree processing solid angle, the actual propagation distance between the gimbals can vary by up to ±1 m. This variation can be even larger in the case of the arrangement for in situ laser peening of large parts as shown in FIG. 2.

The transmitter and receiver gimbals are of similar design and specifications in an embodiment of the system. The motor for a representative system in each axis has a resolution of 25 µrad (5.2 arcsec), a repeatability of 50 µrad (10.3 arcsec), and an absolute accuracy of 100 µrad (20.6 arcsec). These specifications are for the actual reflected beam; the values for the mirror angles are as much as 2× smaller, depending on the orientation of the mirror. The transmitter and receiver mirrors are 4" in diameter in a representative embodiment, and have a high damage threshold coating that efficiently reflects the beam over an angle of incidence range of 15-55 degrees.

FIG. 4 shows a schematic of the optical components and beam paths within the DGS as mounted on a support structure 50, which is in turn mounted on a robot for precise orientation. An incoming laser beam reflects from the receiver gimbal mirror M56 shown at the bottom of the figure. A protective window W57 on the input and protective window W39 on the output of the DGS enclosure creates a sealed, clean environment for the optical components. The control system always maintains P-polarization for the incoming beam resulting in a 0.6% reflection from the first uncoated beam splitter WS58. The reflected beam is rotated to S-polarization by a 90° quartz rotator WP59, causing 8% to reflect from the next beam splitter WS60 which is directed to a calibrated energy meter EM61, which can comprise a pyroelectric sensor or other type of energy or power sensor. The beam that transmits through the energy meter splitter WS60 is passed through another compensating splitter WS62, having an optical wedge which cancels the offset angle, beam displacement, and beam reshaping from the energy meter beam splitter WS60. The beam is then reflected by another beam splitter WS63 into a diagnostic telescope, including lens L64 and lens L65, with beam splitter WS66 in between. The diagnostic telescope directs an image of the beam from an image plane approximately at the output aperture of the laser system, to beam profile camera C67, which records a beam profile.

After passing through the high energy beam splitter WS58, the main beam then hits the tracer beam splitter WS68. This splitter WS68 has an optical wedge which cancels the offset angle, beam displacement, and beam reshaping from the high energy beam splitter WS58. The first surface of the tracer beam splitter WS68 reflects <0.3% of the high energy pulsed beam but reflects 16% of the tracer beam which is S-polarized. The sampled beam is directed by another beam splitter WS69 into a diagnostic telescope including lenses L70 and L71 with beam splitter WS73, and which is equipped with two cameras: tracer beam pointing camera C74 in the path of the beam reflected at beam splitter WS73, and tracer beam centering camera C84 at the focus of the output lens L71. The centering camera C84 records an image of the tracer beam on the surface of the receiver gimbal mirror M56 and the pointing camera measures the pointing direction of the beam by looking at the image at the focus of the telescope input lens L70 (the far field). The information from these two cameras C74 and C84 is used to maintain beam alignment through the stinger by the active control of the transmitter and receiver gimbals. A high speed shutter S72 built into this telescope is used to protect the cameras during each high energy laser pulse.

After the tracer beam splitter WS68, the high energy beam passes through a precision controlled $\lambda/2$ wave plate WP75 which is used to rotate the P-polarized beam to whatever polarization is needed to provide optimal effectiveness for off-axis peening on the surface of the work piece. The next component, the Stokes lens pair SP76, is made up of two cylindrical lenses of equal and opposite power. When the curved surfaces of the cylinders are rotationally aligned, they cancel, causing no change in the transmitted beam. However, when one lens is rotated relative to the other, the beam diverges in one axis and converges on the other. Both lenses can be rotated as a pair to orient this anamorphic power in an arbitrary direction with respect to the outgoing beam, allowing the aspect ratio of the beam to be corrected on the surface of the work piece.

The last lenses in the DGS are negative and positive lenses, L77 and L78, which form a zoom telescope. The negative lens L77 can be translated along the optical propagation axis in order to vary the spacing between the lenses. This changes the divergence angle of the beam exiting the stinger effectively changing the spot size on target. The final active component in the DGS is the raster gimbal mirror M80, which scans the output beam across the surface of the component being laser peened. Finally, a calibration camera C81 is mounted on the assembly, and arranged to provide an image of the work piece at the location of the tracer beam, or working beam. Calibration camera C81 has its own pan/tilt mount and zoom/focus controls and is arranged to provide an image of the work piece at the location of the tracer beam, or working beam in the near infrared.

The optical components illustrated in FIG. 4 are mounted in an assembly, which can be referred to as a dual gimbal stinger (DGS), which adds beam scanning and beam formatting capability incorporating actively adjustable optics. Active beam formatting components on the stinger include the zoom telescope L77/L79, which allows the output divergence of the beam to be actively adjusted for each spot; a pair of cylindrical lenses of equal and opposite power (called a Stokes pair SP76) which serve a provide a large adjustment range for aspect ratio control; and a rotatable half-wave ($\lambda/2$) plate WP75, or other polarization controller, that allows the polarization from the stinger to be rotated to any arbitrary angle.

One of the concerns with the dual stinger design is weight. Compared to the previous moving beam system, the addition of a second gimbal and the motorized drives for the wave plate, Stokes pair, and zoom telescope add a significant amount of additional mass. To counteract this, carbon-fiber composite was used as the primary structural material for the support structure 50.

The beam shape corrections that allow a complex pattern of spots to be delivered from a fixed scanning mirror position need to be made for each individual laser pulse. The active optical components on the assembly must be accurately moved to make the dynamic adjustments. As mentioned before, the receiver gimbal mirror M56 is mounted on a gimbal having precise control based on calibrated parameters for the receiver gimbal azimuth axis and the receiver gimbal elevation axis. The receiver gimbal is under closed-loop control and keeps the beam accurately pointed through the optics on the stinger. The beam alignment is verified and corrected (if need) on every shot. A precision rotary stage is used to adjust the $\lambda/2$ wave plate WP75 (polarization rotator) based on calibrated parameters. The two cylindrical lenses that make up the Stokes pair are adjusted by independent precision rotary stages used to adjust the aspect ratio, also based on calibrated parameters. The input lens L77 on the zoom telescope is mounted on a 200 mm high speed linear stage, which is used to adjust the zoom telescope output beam divergence in order to control spot size on target. Finally, the raster gimbal mirror M80 is mounted on output raster gimbal having precision controllable scanner mirror azimuth axis and scanner mirror elevation axis to direct the laser beam to each spot on the surface of the work piece based on calibrated parameters.

TABLE I

Representative optical component descriptions

| Item # | Description |
|---|---|
| M56 | 4" gimbal mirror 35-55° |
| W57 | 5" protective window |
| WS58 | 4 × 3" wedged splitter |
| WS68 | 4 × 3" wedged splitter |
| WP69 | 3" half wave plate |
| SP76 | (first lens) 3" negative cylindrical lens |
| SP76 | (second lens) 3" positive cylindrical lens |
| L77 | 3" negative zoom lens |
| L78 | 4" positive zoom lens |
| W79 | 5" protective window |
| M80 | 4" gimbal mirror 15-42° |
| WP59 | 3" 90° quartz rotator |
| EM61 | Pyroelectric energy meter |
| WS62 | 4 × 3" wedged splitter |
| WS63 | 4 × 3" wedged splitter |
| WS69 | 4 × 3" wedged splitter |
| L64 | (first lens) 3" diagnostic doublet lens 1 |
| L64 | (second lens) 3" diagnostic doublet lens 2 |
| S72 | High speed shutter |
| WS73 | 1.5" square splitter |
| C74 | CCD camera |
| L71 | 1" diagnostic collimating lens |
| C84 | Digital camera |
| WS63 | 4 × 3" wedged splitter |
| L64 | (first lens) 3" diagnostic doublet lens 1 |
| L64 | (second lens) 3" diagnostic doublet lens 2 |
| WS66 | 1.5" square splitter |
| L65 | 1" diagnostic collimating lens |
| C67 | Digital camera |
| C81 | Digital camera |

The DGS optical system was designed to support square spot sizes in the range of 3-5 mm at the impact area, although it is reasonable to expect that good spot shape control will also be possible at even larger spots. For other spot specifications, of course, and for different embodiments of the stinger, different optical components could be utilized.

Figure 5:
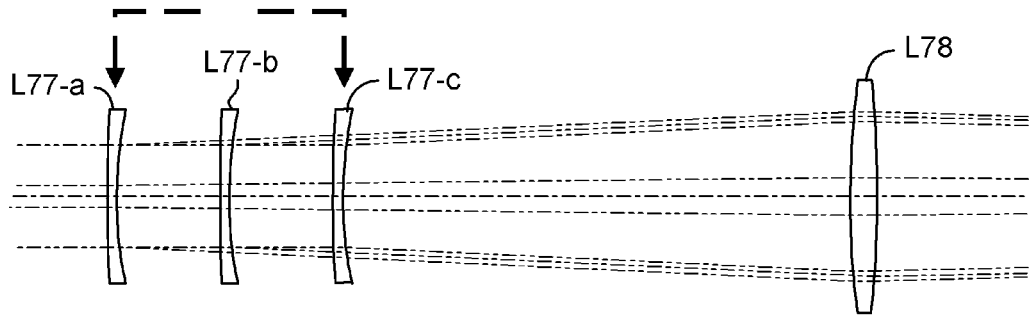
FIG. 5 illustrates a zoom telescope with a linear translation stage for adjusting an input lens, like that used in the assembly of FIG. 4.

FIG. 5 shows the zoom telescope system with the negative lens element L77 in three different operating points (L77-a, L77-b and L77-c) for a 3 mm square spot on target at normal incidence. 100 mm of travel on the negative lens L77 between points L77-a and L77-c, can change the beam divergence between the negative lens L77 and positive lens L78, in order to move the 3 mm image point from 42" to 62" from the final raster gimbal mirror M80.

The laser peening treatment plane using the zoom telescope embodiment here, can be adjusted between 48.5" to 62.5" (1230 to 1590 mm) for a 3 mm spot, with a nominal image plane located at 54" (1370 mm). For a 5 mm spot, the stand-off range is from 46.5" to 59.5" (1180 to 1510 mm).

Figure 6A:
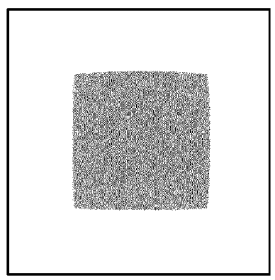
FIGS. 6A-6C include images of spot distortion arising from use of a linear translation stage for adjusting divergence of the beam in a zoom telescope like that of FIG. 5.
Figure 6B:
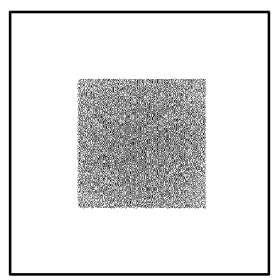
Figure 6C:
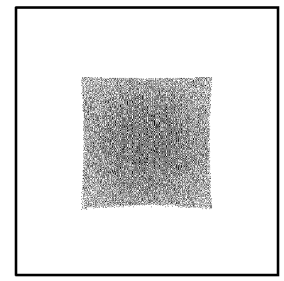

The ranges of operation for the zoom telescope depend on the path length change available for the translation stage. In a representative example, the linear stage installed on the negative lens is capable of a 200 mm total path length change. However, operation beyond the 100 mm adjustment may result in spot shape degradation from an ideal square, primarily characterized by increasing levels of pincushion distortion. FIGS. 6A to 6C show the results of non-sequential ray trace analyses of the imaging system, illustrating changes in spot quality (FIG. 6A—barreling, FIG. 6B—no distortion, FIG. 6C—pincushion) as a function of zoom lens position. A limit of ±4% spot shape distortion (barreling to pincushion) is a suitable design goal. It would be possible to improve the square spot imaging performance using a more complex lens design, in particular one that incorporates additional moving elements. However, the successful design of an optical system for use with high energy, high power laser beams is very challenging due to the weak reflections that occur from anti-reflection coated lens surfaces. These unintended diverging or converging reflected beams (generally referred to as ghosts) can come to focus at other parts of the optical train and cause optical damage that is often times in a completely different part of the laser delivery system. The optimal design must be kept simple enough to manage and direct the large number of first and second reflections, preventing the failure of other optical components in the system. Of course the additional surface losses also lower the overall transmission of the beam train, requiring that the laser be operated at a higher output energy to generate the same energy on target. A final design consideration is that a more complex, better-corrected imaging system will usually require spot sizes on intermediate lens components that are significantly smaller than the input beam size. This also must be avoided to provide protection against optical damage from the high laser power densities that would be present.

Figure 7:
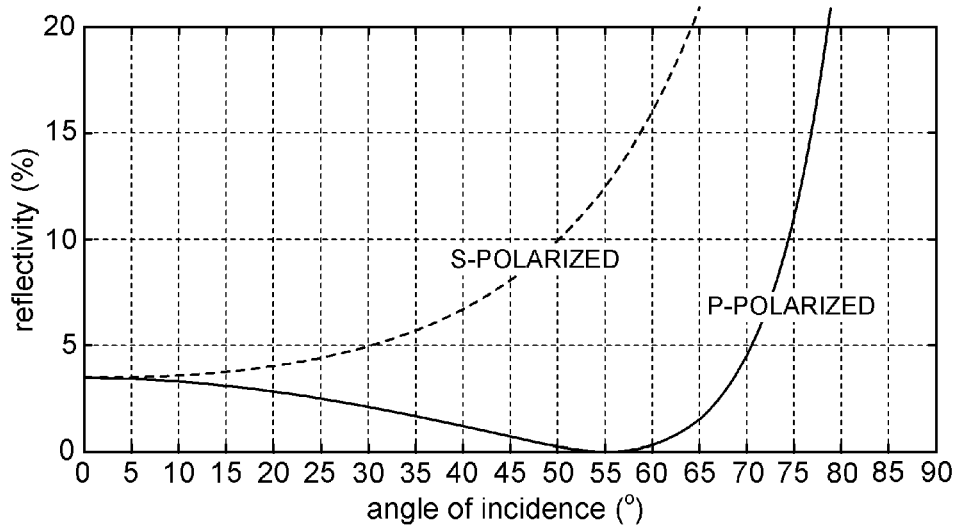
FIG. 7 is a graph showing reflectivity versus angle of incidence for P-polarized and S-polarized components of a laser beam on the surface of a material such as a tamping fluid used in a laser peening process.

FIG. 7 is a graph of reflectance versus angle of incidence for a material such as quartz or water, in which the solid line shows the reflectance of a P-polarized beam in the broken line shows the reflectance of a S-polarized beam. In a laser peening operation, a tamping fluid such as water is flowed as a thin film over the surface of the work piece. Reflectance of the laser pulses from the water reduces the energy available for inducing the shockwave needed for laser peening. As described above, the system here provides active beam formatting, and is designed for applying pulses over work pieces with compound surfaces. Thus, within a given process area the impact areas for individual spots can lie on surfaces with angles that vary over 60 degrees or more, and in some example can vary over as much is 90 degrees or more causing significant variations in the angle of incidence for the pulses within a single process area.

Since the laser pulses in the system are polarized, it can be seen at variations in the angle of incidence can cause substantial differences in reflectance. For water example, an angle of incidence over about 30 degrees would cause substantial differences in the reflectance of the S-polarized and P-polarized beams. The polarization rotator WP75 in the stinger allows for setting a polarization for each spot individually in order to align the polarization close to the P-polarization for the impact surface, which can be defined by numerically determining a nominal surface normal vector for the impact area for each laser pulse, and setting the polarization to match the P-polarization for that nominal surface normal vector. These polarization values can be calibrated using 3D modeling during the calibration stage as described below.

As described above, the stinger includes a Stokes pair SP76, which comprises a set of matched cylinder lenses, one positive and the other negative. The Stokes pair lenses have no optical power when their axes are aligned. However, as they are rotated in opposite directions, cylindrical power can be introduced into the beam train. A positive cylindrical wave front is introduced in one axis and a negative in the other, causing the beam on target to shrink in one dimension and expand in the other. In most cases of off-axis peening, the goal is for the spot to shrink only along one axis in order to compensate for a non-zero angle of incidence. For this reason, the correction must also include an adjustment to the zoom telescope lens spacing to reduce the overall spot size so that the longer axis remains at a constant length.

The process of spot shape correction is most easily visualized for corrections that fall along an axis parallel to one dimension of the spot (orthogonal). However, the anamorphic correction can be rotated to any angle with respect to the incoming square laser beam, allowing square spots to be tiled over surface shapes with compound curvatures. The field rotator (M52-M53 in FIG. 3) is used to provide the necessary field rotation for the spots.

There is generally a need to monitor beam characteristics such as pulse energy, pulse duration, and beam profile for applications using high energy laser systems. This can be done by taking a weak sample of the beam using a beam splitter or by monitoring the low level transmission of a high-reflectivity mirror coating. Optical coatings for a beam splitter can be designed to reflect only a small percentage of the high energy beam or for a mirror, to transmit only a small percentage. Both of these approaches can be problematic, however, if a very stable, calibrated sample is required for the purpose of monitoring the energy or power in the main beam. The exact reflectivity of high damage threshold dielectric optical coatings can often be a function of environmental conditions such as temperature and humidity and can be very angle sensitive. For example, a high-quality mirror coating might have a reflectivity of 99.5%. If, due to environmental conditions, damage, or even heating from the high power laser beam, the reflectivity drops to 99.4%, it would still be a very good mirror. However, if the optical control system relies on the 0.5% transmitted beam determine the energy in the main beam, then this 0.1% change will cause an unacceptably large 20% calibration error. A similar argument can be made against the use of a reflected beam from an anti-reflective (A/R) coating.

Figure 8:
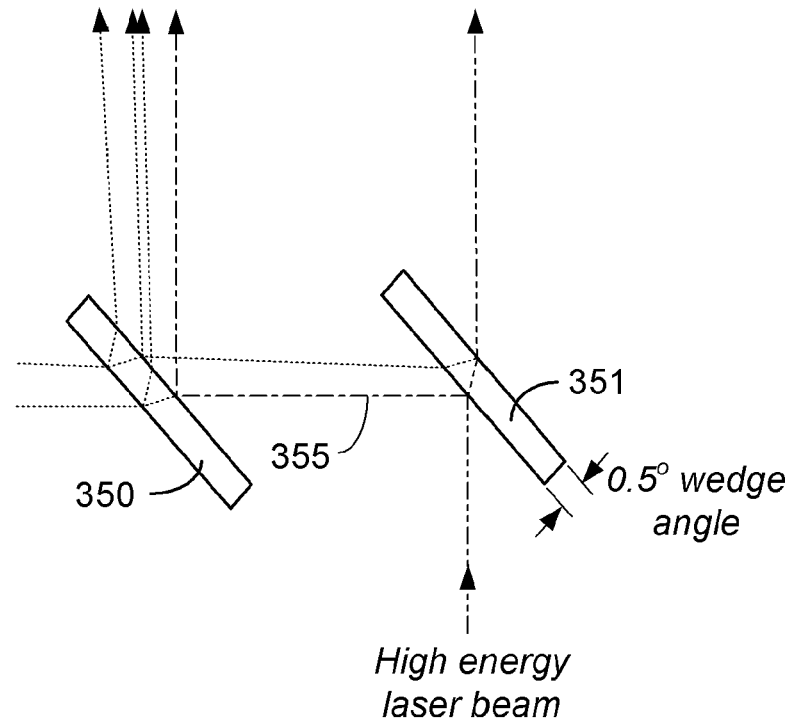
FIG. 8 illustrates a beam splitter arrangement, known in prior art systems.

In order to avoid the pitfalls of calibrated transmission or reflection from optical coatings, the laser and beam delivery systems use only uncoated optical surfaces to sample the high power beam. The reflectivity from these surfaces is determined by the index of refraction of the optical substrate (glass) at the laser wavelength, the angle of incidence, and the beam polarization. The first two parameters are easily controlled and for the output of the laser design, the polarization is very stable. FIG. 8 shows a beam splitter using a fused-silica wedge 351 oriented with an incidence angle of 45 degrees with a P-polarized beam. For wedge 351 the reflectivity is only 0.6% from each surface of the splitter (called Fresnel reflectivity) for a total transmission of 98.8%. Typically, the beam splitter is fabricated with a 0.5 to 1.0 degree wedge which allows the beam from the front and rear optical surfaces to be spatially separated and prevents optical interference effects which can change the sampling ratio. The first surface reflection on line 355 is used for calibrated energy measurements. The second surface of the wedge 351 sometimes receives an anti-reflection coating to reduce the overall insertion loss to the main beam although typical A/R coatings often have reflectivities that are not much below the 0.6% of the uncoated surface for this case. A reflected component that is 0.6% of a 15-20 J pulse from a laser system used for laser peening, is still too energetic for a typical pyroelectric energy meter so the first wedge 351 is usually followed by a second wedge 350 to further attenuate the sampled beam, as shown in FIG. 8.

While this uncoated beam splitter method of FIG. 8 works for the well-polarized output of the laser system, it does not work well when installed as an energy measurement system on a moving beam stinger. The square beam from the laser system (and its polarization) must be rotated to different orientations at the output of the laser in order to end up with a correctly oriented spot in the stinger and on the surface of the work piece. When a laser beam reflects from a mirror with a dielectric optical coating, the polarization is completely unchanged as long as the direction of polarization is in pure S or P-polarization, i.e. parallel or perpendicular to the plane of incidence. However, if the beam has a non-orthogonal polarization, small depolarization errors can result, slightly changing the beam polarization and degrading the polarization contrast. As an arbitrarily oriented beam reflects from the various mirrors between the output of the laser system and the moving beam stinger, these depolarization errors accumulate. Although the total error is not sufficient to degrade off-axis laser peening performance, it can cause significant changes in reflectivity for a double beam splitter pair as shown in FIG. 8. For example, a 2× increase (i.e. doubling) in light levels after two beam splitter reflections would result from a depolarization state that only changes the surface reflectivity by 0.25%. This is an almost inconsequential change in energy and polarization (a few degree rotation) delivered to the target surface but causes a 2× error in measured energy.

Figure 9:
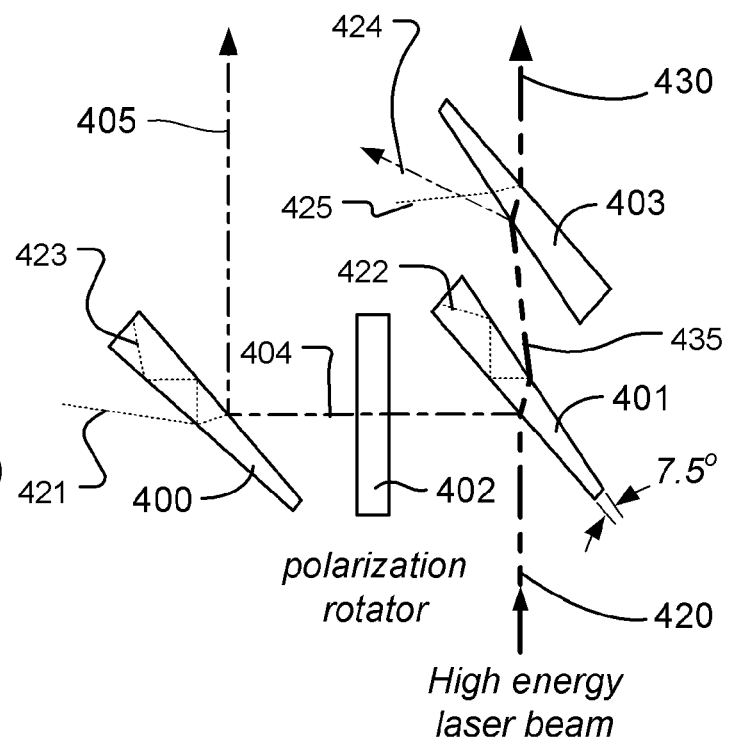
FIG. 9 illustrates a polarization independent beam splitter which can be used in a system like that of FIG. 4.

A beam splitter system that is insensitive to polarization errors is shown in FIG. 9, and implemented in the stinger shown in FIG. 4. In the system of FIG. 9, two uncoated beam splitters 401, 400 are arranged with a 90 degree rotator 402 placed in between the splitters. As a result, the split-off beam on path 405 becomes completely insensitive to polarization errors. In the example shown in FIG. 9, the beam splitter wedge 401 is placed in the path 420 of a high-energy laser beam. A sample of the beam is reflected off the input surface of the splitter wedge 401 on path 404. The sample on path 404 will include components of two orthogonal polarization states (i.e. S-polarization and P-polarization) of the laser energy on path 420, the relative magnitudes of which depend on the input polarization as discussed above. A quartz rotator 402 rotates the polarization of both components of the transmitted beam on path 404 by a constant angle (90 degrees in this case), regardless of the polarization state of the beam. After rotation, a sample of the beam from line 404 is reflected off the input surface of splitter wedge 400 on path 405. The two beam splitter wedges 401, 400 are arranged to have matching incident angles (e.g. 45 degrees) for the beams path 420 and path 404 respectively. However, this design will work with any angle of incidence as long as the angles on each of the two beam splitters are equal. The polarization rotation and matched incident angles cause the reflectivity of the surfaces of the two beam splitters 401, 400 to be the product of the reflectivity of two orthogonal polarization states, which is a constant. Depolarization errors of the laser energy on path 420 will now have no effect on the percentage of the main beam's energy after two reflections delivered on path 405, resulting in a polarization independent diagnostic beam.

Figure 10:
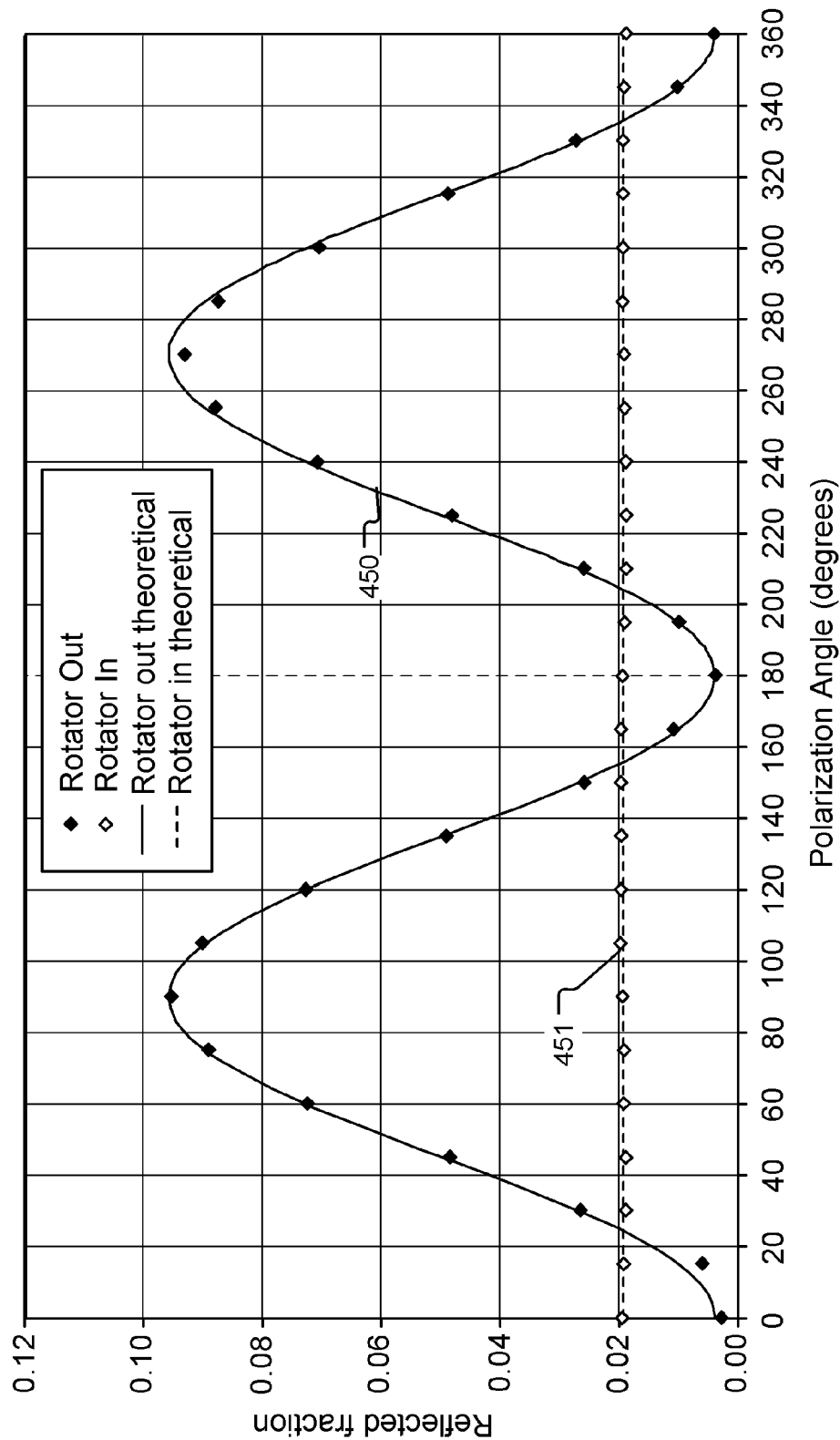
FIG. 10 is a graph of reflected fraction versus input polarization angle for a system like that of FIG. 9, with and without the polarization rotator.

FIG. 10 is a graph that demonstrates this polarization independence experimentally. A two beam splitter configuration was set up for these measurements. Instead of 45 degree angles of incidence, as shown in FIG. 9, angles of 72 degrees were chosen to accentuate the polarization-induced reflectivity errors. The trace 450 shows the points for the configuration without the polarization rotator, where the solid diamond points show measured values and the solid line shows the theoretical values of the reflected fraction over a complete 360 degree polarization scan, which fluctuates significantly. Note the strong dependence of the measured signal on input polarization. The trace 451 shows the point for the configuration after inserting the 90 degree quartz rotator between the splitters, where the opened diamond points show measured values and the dashed line shows the radical values of the reflected fraction over a complete 360 degree polarization scan. Even for the very dramatic polarization changes of this demonstration, the sampled fraction as can be seen on trace 451 remains constant.

As pointed out in the previous beam splitter wedge discussion, there is a reflected beam generated from both surfaces of the beam splitter and these need to be separated. As shown in FIG. 9, the majority of the laser energy on path 420 is not reflected on the input surface of the splitter wedge 401, but rather is slightly diffracted through the splitter and exits the output surface on path 435. However, at the output surface, a portion of the beam is reflected on path 422. For this application of a beam splitter is important that the portion of the beam reflected on the output surface be separated from the portion of the beam on path 404 which will be delivered to the diagnostic component. This separation is typically done in a beam splitter like that of FIG. 8 by introducing an optical wedge between the front and back surfaces so that the two beams can diverge from each other. This can be seen in FIG. 8 by the reference to a 0.5 degree wedge angle, and the slight divergence of the beam reflected from the output surface of the splitter 301 relative to that of the beam reflected on the input surface. The size of this wedge is normally kept small to minimize refractive repointing of the transmitted beam and to prevent a dimensional change in the beam in the plane of optical incidence. The two beams can be separated for the purposes of use by diagnostic equipment, by allowing them to propagate far enough for the angle between them to provide complete separation or by using a field-stop at the focus of an imaging telescope. Both of these approaches are difficult to apply to the moving beam stinger, or other applications of compact diagnostic equipment for laser systems. In space-limited environments, like the robot mounted stinger described herein, there is insufficient space in the optical housing to provide for sufficient divergence of the beams to the point that the undesired beam can be blocked. In systems in which the sample beam is used for diagnostic processes such as optical tracking, a field stop in a centering/pointing telescope might be used to block the secondary beam. However, such a field stop would prevent detection of off-axis beams during optical tracking.

In the configuration shown in FIG. 9, to suppress the unwanted rear surface beam splitter reflections (referred to as ghosts), a large enough wedge angle is used in the embodiments described here, such that the beams on paths 422, 423 reflected from the second surface of the beam splitter wedges are trapped inside the optical element by total internal reflection. This requires that the internal optical incidence angle be greater than the critical angle for total reflection, which for a fused silica substrate and the laser wavelength of 1053 nm, is 43.6 degrees. As shown in FIG. 9, for a 45 degree angle of incidence on the external surface, this is readily achieved with a beam splitter wedge angle of 7.5 degrees. As shown in FIG. 9, the number of sampled beams after two beam splitters is reduced from 4 beams in the conventional case illustrated in FIG. 8, to a single, clean beam on line 405 using the wedges of FIG. 9. The internally reflected light bounces through the interior of the splitter and scatters out the optically rough ground edges of the substrate and is lost. Beams on lines 421 and 425 can be blocked because of their large angles relative to the desired beam samples.

As mentioned earlier, a beam splitter wedge, like the wedge 401 and wedge 400 in FIG. 9, causes strong repointing of the transmitted beam and one dimension of the beam is reduced (re-pointing by 7.5 degrees and width reduction of 23% for the illustrated case). However, this effect can be completely eliminated as shown in FIG. 9, by placing a second beam splitter wedge 403 in the output beam line, reversed in direction from the first. The laser energy on path 435 is refractive by the wedge 403 and exits on path 430. This restores the original pointing direction so that paths 420 and 430 are parallel. Also, by placing splitter 403 at the correct distance from the first splitter wedge 401, the beam offset can be canceled beam path 420 and beam path 430 are aligned. As a result, the high power beam on path 430 is unchanged in direction, displacement, and width relative to the beam on path 420. The total optical loss introduced by the 4 uncoated surfaces of the double beam splitter set is only 1.8% for P-polarization. Furthermore, the stinger of FIG. 4 uses the first surface of the second compensating wedge 403 to direct a sample on path 424 of the S-polarized tracer beam for centering and pointing cameras C74, C84 as shown in FIG. 4.

As shown in FIG. 4, the ghost-free beam splitters are used to collect the beam sample from the primary high energy beam, to direct a second sample to the calibrated energy meter, and to reflect beams into each of the diagnostic imaging telescopes. In combination therefore, a polarization independent energy meter is provided. Also, a polarization independent diagnostic system is provided.

The dual gimbal stinger approach provides the ability to accomplish very accurate spot pattern placement on the work piece using the raster gimbal to scan the laser beam over the surface. Adjustable optics correct for polarization, spot orientation, size, and aspect ratio. By using the raster gimbal, process robot motion between each shot is not required, increasing both spot placement precision and overall accuracy.

For this to work, however, a good method of registering the pattern onto the work piece and producing calibrated parameters for pulse to pulse control is needed. As explained earlier, the goal was an approach that could be accomplished quickly, reducing the time to locate the spot pattern on a new part in minutes rather than in days or weeks.

The first step in the process is to design the desired pattern of laser peening spots, working from a solid-model of the work piece in a computer aided design CAD system.

Figure 11:
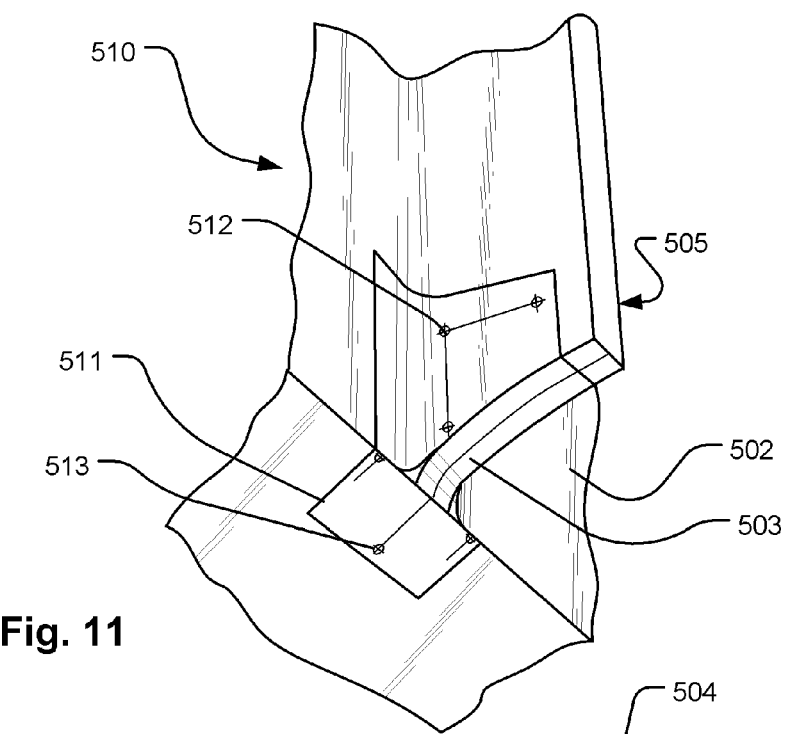
FIG. 11 is a drawing of a portion of a work piece having compound surfaces, including an overlay mask with registration marks thereon.

For a work piece with compound surfaces, like aircraft component 510 shown in FIG. 11, the impact areas for each laser pulse can have significantly different incidence angles. The work piece shown in FIG. 11 comprises a component of manufactured aircraft with a bottom side 501 and an outer surface 502 on which a rib 510 is attached. The rib has a lower side 503, an aft side 504 and a forward side 505. An overlay mask 511 which comprises a material such as Mylar which has very high dimensional stability is configured to match the surfaces of the work piece, and to be placed on the structure with edges that enable it to be quickly, easily and accurately placed by a technician. The overlay mask 511 has sets of registration marks, such as mark 512 along with two additional marks on the aft side and mark 513 along with two additional marks on the lower side of the structure.

Figure 12:
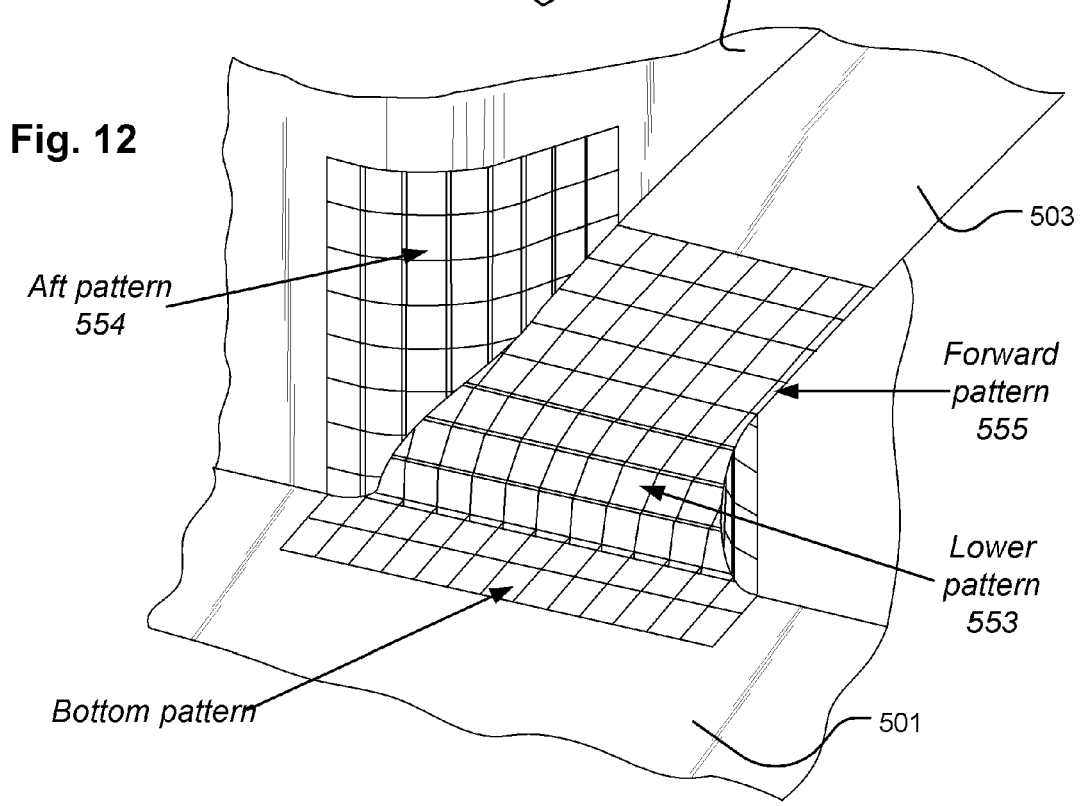
FIG. 12 illustrates patterns comprising arrays of rectangular or square impact areas of laser pulses in the process areas on the aft, beard and forward sides of the rib shown in the drawing.

FIG. 12 shows an example of nominal shapes and locations in the process areas for three patterns on the component of FIG. 11, including a lower pattern 553 on surface 503 of the rib, an aft pattern 554 on surface 504 of the rib, and a forward pattern 555 on surface 505. Each spot has an impact area defined by a size, the 3-dimensional location of its center, a rotational vector defining spot orientation on the surface, and a normal vector (based on a nominal surface normal vector) containing information about the local orientation of the surface in space. The spots are about 4.5 mm square, aligned and adjacent to one another, within a process tolerance, in an array to cover the process area.

The method to calibrate the beam delivery system to the work piece relies on the continuous-wave (CW) infrared tracer beam that is co-aligned to the high power pulsed beam. This can be the same beam that is used to maintain closed-loop alignment control of the transmitter and receiver gimbals for the moving beam system. In one embodiment, a dimensionally-stable mylar surface overlay mask 511 is formed to fit the work piece, that can be manually applied to the work piece indexed to easily identified geometrical features (edges, corners, holes, etc.). The mask has a set of registration marks as shown in FIG. 11 on each pattern area, which can be correlated to corresponding locations in the 3D solid model of the target, and used for calibration of the process area space. The philosophy for a laser peening embodiment of the masks is to provide precise (<0.5 mm, 0.020") alignment of the laser peening pattern to the most critical, high-stress features on the work piece. In other examples, features (e.g. corners, edges, holes, etc.) of the work piece itself can be used as registration marks for the calibration process.

As the example shown in FIG. 11, each area on the alignment mask corresponding to a process area incorporates three registration marks used as laser targets. The location of each of these targets is accurately defined relative to the previously generated spot patterns, such as shown for heuristic purposes in FIG. 12. The calibration procedure for a pattern consists of aligning the tracer beam to each of the 3 registration marks with a precision of for example, 0.1 mm, and recording the azimuth and elevation angles for the raster gimbal M80 for each location, while the input gimbal M56 remains stationary. This is accomplished using a sensor 125 such as a remote-controlled camera system on the raster end of the stinger, as shown in FIG. 2. This corresponds as well to camera C81 in FIG. 4. Since the sensor 125 must generate a sharp image of the infrared tracer beam spot as well as the illuminated target, it can be equipped with a visible-light blocking filter. This allows it to accurately focus at the laser wavelength of 1053 nm used for the high energy processes, on the registration mark which is illuminated by a separate diffuse infrared light source at 940 nm. These wavelengths are sufficiently close that the operator sees a well focused image of both the beam and the registration mark.

Figure 13:
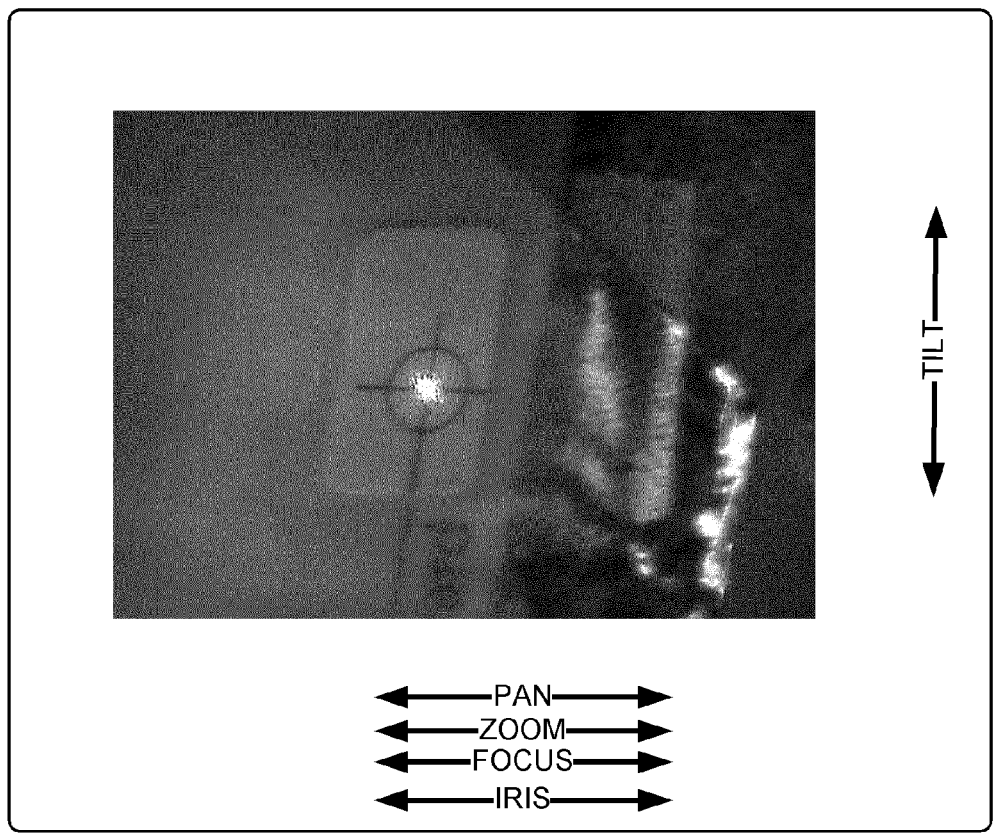
FIG. 13 is an image of a user interface for a computer system used for calibrating beam delivery optics like those described herein.

FIG. 13 is a simplified view of an operator console graphical interface including a screen image of the tracer beam aligned to one of the laser targets, used by an operator during the calibration process. The operator views the illumination appearing on the work piece while controlling the raster gimbal to move the spot to the registration point. Alternatively, computerized pattern recognition can be used to automatically locate the center of each target without operator intervention. At each registration point, the azimuth and elevation angles for the raster gimbal mirror M80 are recorded. A paper overlay can be applied over the mylar film at the location of each laser target to reduce laser scatter and speckle generation by the semi-transparent Mylar film, enhancing the image.

Figure 14:
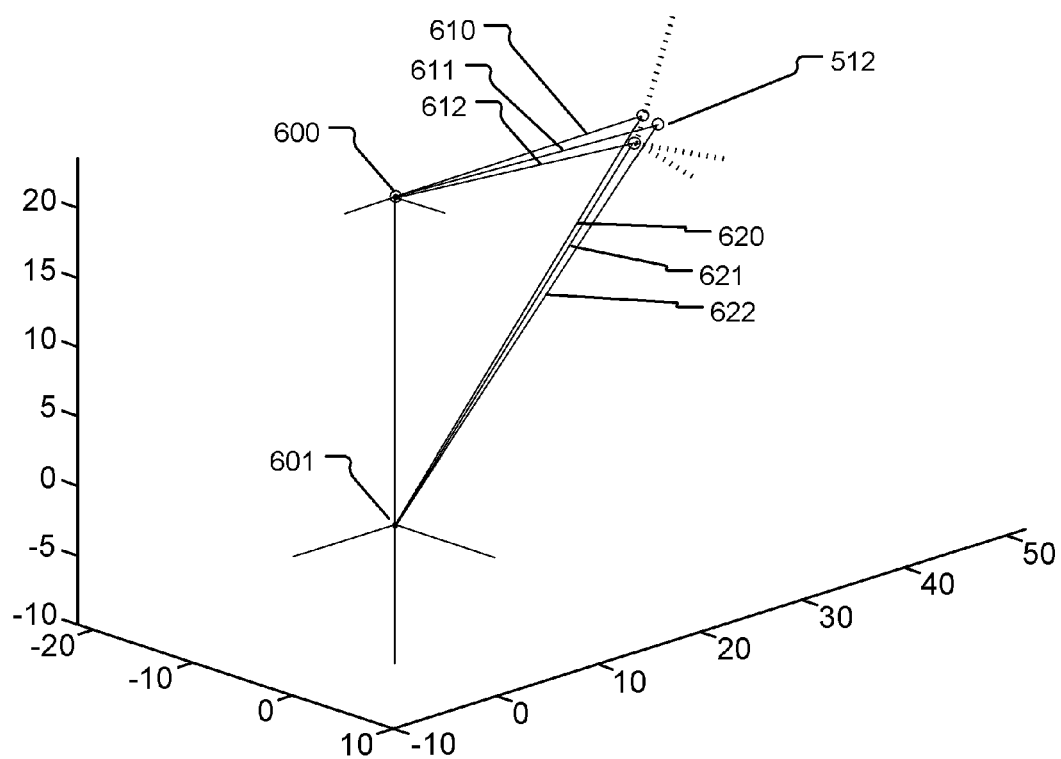
FIG. 14 illustrates the geometry of a process for calibrating the beam delivery optics to generate a pattern like that of FIG. 12 on a work piece having compound surfaces.

To calibrate the space for the process area, the process of locating each of the three laser targets is repeated from two different stinger locations and allows a synthetic stereo image of the registration marks on the work piece to be constructed using techniques similar to those applied in photogrammetry. As can be seen in FIG. 14, from a first stinger position 600, the azimuth and elevation angles for lines 610, 611, 612 are determined, where the lines 610, 611, 612 extend from the raster gimbal mirror M80 at position 600 to corresponding registration marks, e.g. mark 512 on the work piece. The stinger is then moved vertically or otherwise to a second position 601. A precise numerical fit results from locating the three mask targets from two different raster mirror positions. In one example, the raster mirror was moved 60 cm (23.6") along the vertical axis from the first position 600 to the second position 601. The top position represents the raster mirror position used for high energy laser peening. From the second position 601, the azimuth and elevation angles for lines 620, 621, 622 are determined, where the lines 620, 621, 622 extend from the raster gimbal mirror M80 at position 601 to the registration marks on the work piece. This data allows the surfaces of the work piece to be placed into the coordinate frame of reference for the stinger raster gimbal, providing accurate information about the distance between the mirror and the work piece and its orientation in three dimensional (3D) space. Since the locations of the alignment mask registration marks relative to the laser spot pattern are known, each laser spot can then be accurately sized, shaped, and oriented on the treatment surface by the control system on a pulse by pulse basis.

Figure 15:
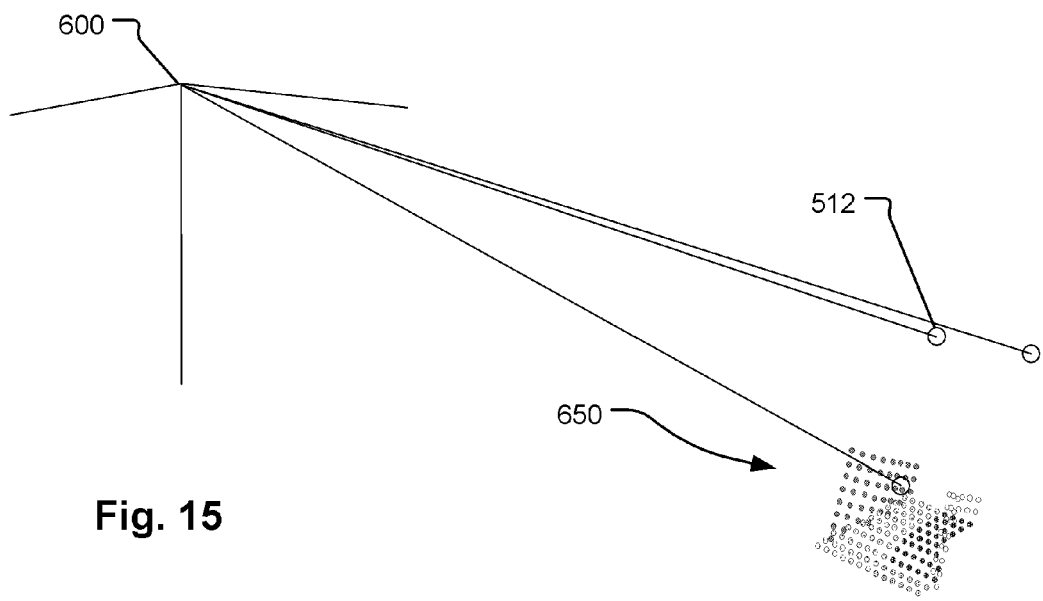
FIG. 15 illustrates the spatial relationship between the position of the optical components on a beam delivery system like that described herein, and the process areas on a work piece, which can be used for producing calibrated parameters for controlling the optical components.

The final step in the calibration process is to determine the coordinate frame of the process area on the target surface relative to the coordinate frame of the stinger, and translating the geometry to calibrated parameters for direction, divergence, polarization, rotation and aspect ratio for each pulse in the pulse pattern. This coordinate transformation is applied to convert each of the previously defined laser spots (impact areas) in the pattern to a process file containing the calibrated parameters for positions of each of the 12 servo-motor optical positioners for every applied spot. Each commanded spot position is generated by the following servo motor positions:

1. Laser polarization rotator
2. Laser field rotator (square spot rotator)
3. Transmitter gimbal azimuth axis
4. Transmitter gimbal elevation axis
5. Receiver gimbal azimuth axis
6. Receiver gimbal elevation axis
7. Stinger polarization rotator
8. Stokes lens #1
9. Stokes lens #2
10. Stinger zoom telescope stage
11. Raster gimbal azimuth axis
12. Raster gimbal elevation axis FIG. 15 illustrates a spot pattern in relationship to three alignment target positions (e.g. for registration mark 512) for the aft process area 650 on the work piece of FIG. 12, taken for the stinger in position 600. Each of the three process areas can be separately calibrated, and peened from different stinger positions, or a stinger position can be chosen that can apply multiple spot patterns from a single stinger position. The results of this alignment produce a pattern of spots that wraps through a fillet on the part. Since the beam was delivered from a single stinger position for each pattern, the incidence angle was required to transition from 45 degrees on one side of the pattern, through 0 degrees (normal incidence) in the center of the fillet, to −45 degrees on the other side of the pattern. In spite of the part geometry, using the technology described herein, the laser spots can be individually controlled to remain square and correctly sized, oriented, and positioned on the surface of the work piece, with a polarization matching the P-polarization plane for the nominal surface normal vector of the corresponding impact area.

Figure 16:
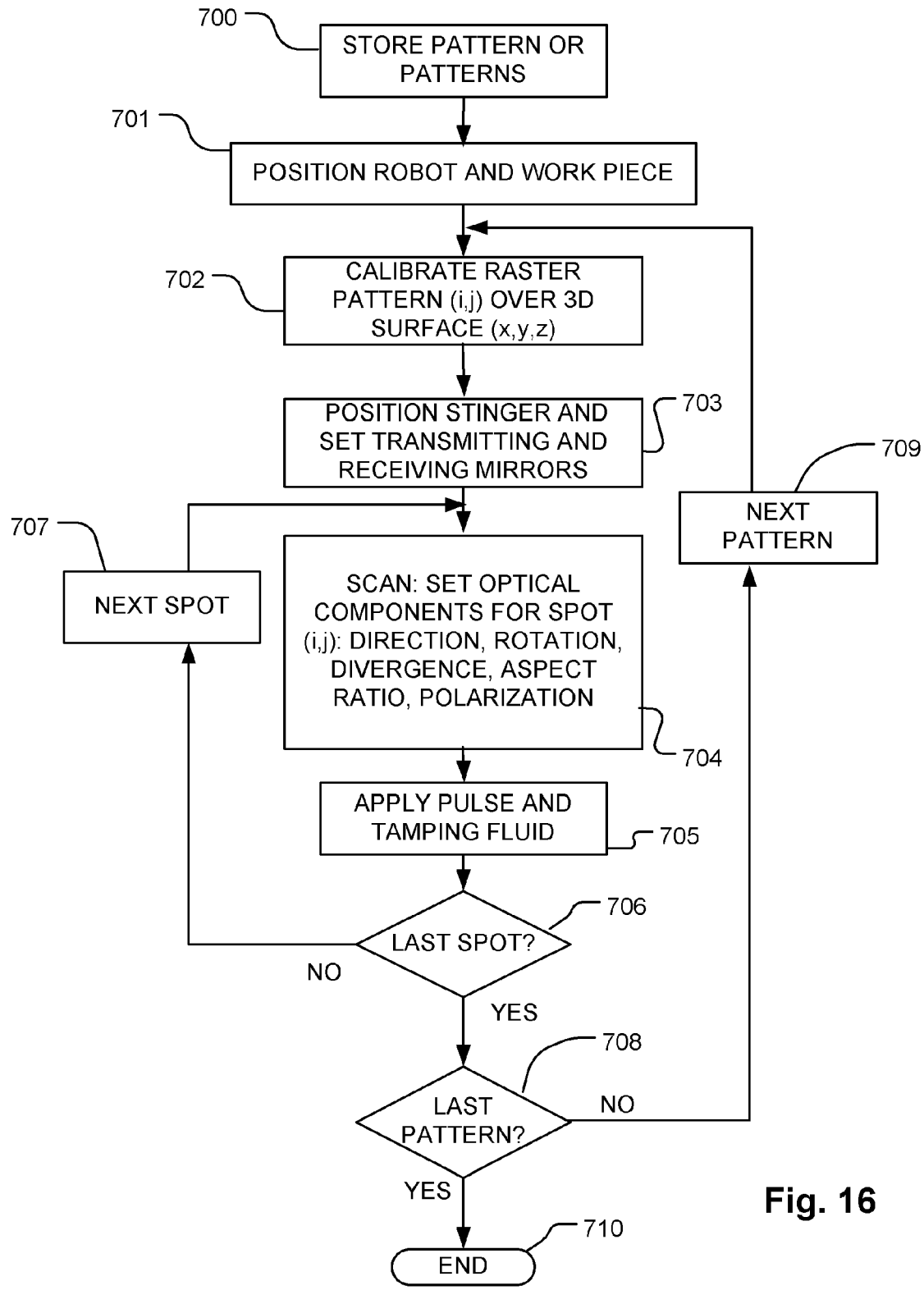
FIG. 16 is a simplified flowchart of a laser peening process using beam delivery techniques as described herein.

FIG. 16 is a simplified flow chart for an algorithm executed by a processor to deliver a plurality of laser pulses in patterns of impact areas in process areas on the surface of a work piece. A simplified process flow begins with storing a pattern or patterns in the control system used for the beam delivery system (700). Next, the robot carrying the stinger is positioned, or a work piece is positioned adjacent the robot, or both are positioned, in a relative positions suitable for delivering a sequence of pulses to the surface of the work piece (701). In a next step, which can be used for each stinger position to be used for a set of process areas, where the set can have one or more members, the raster pattern (i, j) defines a pattern on a process area over two dimensions which is calibrated for each spot in the pattern across the 3D surface (x,y,z) of the target (702). This calibration step as shown in the flow chart occurs after fixing the location of the robot or work piece, establishing relative positions of the work piece and the robot, and can be performed once for all patterns to be processed for the fixed locations of the robot and the work piece using possibly more than one stinger position, or alternatively can be performed once for each stinger position to be used, to generate calibrated parameters for the spots in a set of patterns for which the single stinger location is to be used. For precision alignment, the controller is calibrated for each fixed stinger location to be used for scanning, after the work piece and the robot carrying the stinger are in position for processing. In alternatives, the calibration step can be executed as needed, based on the environment in which the laser process is applied.

Then, for each process area, the stinger is positioned by the robot for the current pattern, the transmitter and receiver gimbals are set so the laser energy can be delivered to the optical components on the stinger (703). Then, a scanning process for a given pattern on a process area is executed (704). In the scanning process, for each spot (i,j) in the process area, optical components in the beam formatting and delivery optics are set to establish the direction, field rotation, divergence, aspect ratio and polarization for each output pulse (704). Upon setting optical components using the calibrated parameters for each spot, the laser pulse is applied, in coordination with tamping fluid in a laser peening application (705). The processor determines whether the last spot in the pattern has been delivered (706). If not, then the next spot is defined (707), and the processor loops back this step 702 (or alternatively to step 703 if the calibrated parameters have been produced already). If the last spot has been delivered at step 706, then the processor determines whether the last pattern for the current set of patterns has been processed (708). If not, then the next pattern is identified by the processor (709), and the processor loops back to step 702 (where it may wait for performance of step 701 if the robot must be relocated to perform the next pattern or pattern set). If the last pattern had been processed at step 708, then the process ends (710). Note that the order of steps represented by the flow chart of FIG. 16 may be altered as suits a given context for the process.

Figure 17:
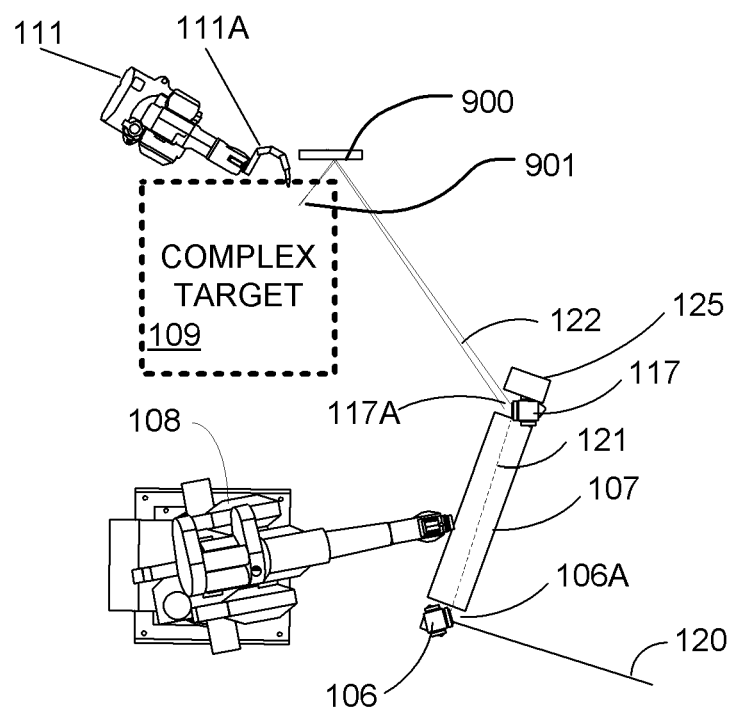
FIG. 17 is a simplified diagram of an alternative system, including a turning mirror.

FIG. 17 is a simplified drawing of a laser peening system, like that of FIG. 2, with like components given like reference numerals, and some components are not described again. As in FIG. 2, the laser beam from line 120 is reflected at mirror 106A on receiving gimbal 106 on the DGS 107. The beam is directed on line 121 to raster gimbal mirror 117A on raster gimbal 117. An alignment camera 125 is configured to image a target location to which the beam is directed. A complex target 109 in this example includes a surface (not shown) that may be difficult or impractical to strike using the DGS 107. To reach this surface, a turning mirror 900 can be mounted near or on the part to having the surface to be peened. The turning mirror, sometimes referred to as a relay mirror, can be for example a five inch, flat mirror, which turns the beam at all the wavelengths used (calibration imaging, alignment, power) on line 122 around a corner on a line 901 to the surface of the complex target. The scanning capability of the DGS enables directing the beam using the calibration processed described above to difficult to reach surfaces using a fixed turning mirror. When laser peening complex parts for example, by placing a separate relay mirror in a stationary position, either supported by the work piece itself or by external means, areas on the part to be laser peened to which there is no possible direct line-of-sight between the rastering gimbal 117 and the area in question can be peened. Using the DGS the calibration and subsequent laser peening can be performed exactly in the same way with and without the turning mirror 900, only by way of the relay mirror which will reflect an infrared image of the part for calibration, the tracer beam, as well as the high power peening beam. There are cases in which you could snake a beam around a corner to a hidden spot but could not fit an entire stinger. FIG. 17 shows a convention water robot 111 used to deliver the flowing tamping layer over the work surface during laser peening. It will often be the case that the inability to establish a direct line-of-sight to the work surface will also make reaching it with a robotically-controlled water nozzle difficult. In this case, fixed water nozzles attached direct to the workpiece can be used to provide the tamping layer. Multiple nozzles, under individual computer control, can be used to cover large complex peening areas.

Representative uses of the described technology include laser peening small and large work pieces and structures, laser peening forming, laser beam delivery for other surface modifications such as heat treatment, texturing, cutting and welding. The system is adaptable for beam delivery for materials processing application of laser energy, including but not limited to including superplastic forming, paint or other type of coating removal, etching, engraving and marking.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for delivering laser energy to a process area on a target surface of a work piece, the target surface including an array of impact areas characterized by variant nominal surface normal vectors, comprising:

placing an optical assembly including a receiving optic, beam formatting optics and a scanner, in a position to receive laser energy from a laser source; and directing laser energy to the receiving optic while the position of the optical assembly remains unchanged, and directing the laser energy using the scanner to a sequence of impact areas having nominal shapes, nominal surface normal vectors and locations in the process area according to a pattern; and when moving from one impact area to another impact area in the sequence while the position of the optical assembly remains unchanged, changing settings including a combination of direction, divergence, polarization, rotation and aspect ratio of the laser energy output from the scanner, to change the polarization and control the shape of the laser energy at the respective impact areas in the process area according to changes in the nominal surface normal vectors and the locations of the impact areas in the sequence.

2. The method of claim 1, wherein the laser energy comprises a plurality of laser pulses, and the pattern comprises an array of impact areas for corresponding pulses of laser energy arranged adjacent to one another within a process tolerance, and wherein the nominal shapes of the impact areas for the plurality of laser pulses in the process area are uniform and rectangular or square.

3. The method of claim 1, including:
calibrating a controller for the position of the optical assembly, which controls optical components to direct the laser energy to the process area for the position of the optical assembly to provide calibrated parameters for direction, divergence, polarization, rotation and aspect ratio for each impact area in the pattern.

4. The method of claim 1, including utilizing a camera mounted on the optical assembly, a tracer beam and a plurality of registration marks on the work piece to calibrate a geometry of the process area on the target surface relative to the position of the optical assembly, and translating the geometry to calibrated parameters for direction, divergence, polarization, rotation and aspect ratio for each pulse in the pattern.

5. The method of claim 1, wherein the source of the plurality of pulses comprises a transmitting mirror including:
adjusting the transmitting mirror to direct the laser energy to the receiving optic on the optical assembly; and
wherein the receiving optic comprises a receiving mirror, and including adjusting the receiving mirror to reflect the laser energy on an optical path segment through a controllable polarization component, a controllable aspect ratio component, a controllable divergence component and a controllable scanning optic on the optical assembly.

6. The method of claim 1, wherein said controlling polarization includes rotating the polarization, so that the laser energy has P-polarization for the nominal surface normal vectors for the corresponding impact areas.

7. The method of claim 1, including using a Stokes pair on the optical assembly to adjust to the aspect ratio of the laser energy.

8. The method of claim 1, including using a beam splitter on the optical assembly to direct samples of the laser energy to diagnostic sensors.

9. The method of claim 1, including using a zoom telescope on the optical assembly, with a translatable lens, to adjust divergence of the laser energy.

10. The method of claim 1, including using a gimbal mounted mirror on the optical assembly as the scanner.

11. The method of claim 1, wherein the variant nominal surface normal vectors inclined relative to a line from the scanner, and wherein the inclines of the nominal surface normal vectors of at least two impact areas within the process area differ by 60 degrees or more, and including controlling the polarization and shape of the laser energy output from the scanner to adjust for the nominal surface normal vectors of said at least two impact areas within the process area.

12. The method of claim 1, wherein the variant nominal surface normal vectors inclined relative to a line from the scanner, and wherein the inclines of the nominal surface normal vectors of at least two impact areas within the process area differ by 90 degrees or more, and including controlling the polarization and shape of the laser energy output from the scanner to adjust for the nominal surface normal vectors of said at least two impact areas within the process area.

13. The method of claim 1, including splitting off a polarization independent sample of the pulses delivered to the optical assembly, and sensing power of pulses based on the sample.

14. The method of claim 1, where the process area has a compound surface.

15. The method of claim 1, including mounting a turning mirror between the scanner and the process area, and directing the laser energy to the impact areas via the turning mirror.

16. A method for delivering laser pulses to laser peen a process area on a target surface of a work piece, wherein the target surface includes a pattern of impact areas for the laser pulses in a pulse pattern characterized by variant nominal surface normal vectors, comprising:
placing an optical assembly including a receiving optic, beam formatting optics and a scanner mounted thereon, in a position to receive laser pulses from a laser source and within an operating range of the process area;
flowing a tamping fluid over the process area;
directing a plurality of polarized laser pulses to the receiving optic while the position of the optical assembly remains unchanged, and through the beam formatting optics to the scanner, and directing the laser pulses using the scanner to respective impact areas having nominal shapes and locations in the process area according to the pulse pattern;
splitting off a polarization independent sample of the pulses delivered to the optical assembly, and sensing power of pulses based on the sample; and
when moving from one impact area to another impact area in the pulse pattern while the position of the optical assembly remains unchanged, changing settings including a combination of direction, divergence, polarization, rotation and aspect ratio of the laser pulses output from the scanner, to change the polarization and control the shape of the laser energy at the respective impact areas in the process area for the corresponding laser pulses;
wherein the pulse pattern comprises an array of impact areas arranged adjacent to one another within a process tolerance, and wherein the nominal shapes of the impact areas for the plurality of laser pulses in the process area are uniform and rectangular or square; and
wherein said controlling polarization includes rotating the polarization so that the pulses have P-polarization for the nominal surface normal vectors for the corresponding impact areas.

17. An apparatus for delivering laser energy to a process area on a target surface of a work piece, wherein the target surface includes a pattern of impact areas for the laser pulses in a pulse pattern characterized by variant nominal surface normal vectors, comprising:
an optical assembly on a mount, including a receiving optic, beam formatting optics and a scanner, the beam formatting optics including a polarization controller, a divergence controller and an aspect ratio controller;
a laser system adapted to produce laser energy;
a beam delivery system to direct laser energy from the laser system to the receiving optic on the optical assembly;
a rotation controller in an optical path between the laser system and the scanner; and
a control system, coupled to the laser system, the optical assembly and the beam delivery system, which is programmed to place the optical assembly in a position to receive laser energy from the laser system via the beam delivery system, and while the position of the optical assembly remains unchanged, to direct the laser energy using the scanner to impact areas having nominal shapes and locations in the process area according to a pattern; and when moving from one impact area to another impact area in the pulse pattern while the position of the optical assembly remains unchanged, changing settings including a combination of direction, divergence, polarization, rotation and aspect ratio of the laser energy output from the scanner, to change the polarization and control the shape of the laser energy at the respective impact areas in the process area of the laser energy according to changes in the nominal surface normal vectors and the locations of the impact areas in the sequence.

18. The apparatus of claim 17, including
a camera on the optical assembly configurable to focus on the target surface;
a tracer beam source arranged to illuminate a spot on the target surface in a calibration mode;
a user interface by which the scanner is controllable in response to an image of the target surface and the tracer beam spot, to place the tracer beam spot on a set of registration spots on the target surface and to save the scanner parameters; and
a processor to translate the scanner parameters into calibrated parameters for the beam formatting optics and the scanner.

19. The apparatus of claim 17, wherein the control system is programmed to rotate the polarization so that the pulses have P-polarization for the nominal surface normal vectors for the corresponding impact areas.

20. The apparatus of claim 17, wherein the aspect ratio controller comprises a Stokes pair.

21. The apparatus of claim 17, including a beam splitter on the optical assembly to direct samples of the pulses to diagnostic sensors.

22. The apparatus of claim 17, wherein the divergence controller comprises a zoom telescope on the optical assembly, with a translatable lens.

23. The apparatus of claim 17, wherein the scanner comprises a gimbal mounted mirror.

24. The apparatus of claim 17, wherein the system is adjustable to direct the laser energy using the scanner to impact areas in the pattern, characterized by and the variant nominal surface normal vectors inclined relative to a line from the scanner, and wherein the inclines of the nominal surface normal vectors of at least two impact areas within the process area differ by 60 degrees or more, and wherein the control system adjusts the polarization and shape of the laser energy output from the scanner to adjust for the nominal surface normal vectors of said at least two impact areas within the process area.

25. The apparatus of claim 17, wherein the system is configured for a process area having a compound curvature.

26. The apparatus of claim 17, including a beam splitter on the optical assembly configured to split off a polarization independent sample of the pulses delivered to the optical assembly, and a pulse power sensor arranged to receive the sample.

27. The apparatus of claim 17, including a support structure for the optical assembly on the mount, comprising carbon fiber composite.

28. The apparatus of claim 17, wherein the laser energy comprises a plurality of laser pulses, and the pattern comprises an array of impact areas for corresponding pulses of laser energy arranged adjacent to one another within a process tolerance, and wherein the nominal shapes of the impact areas in the process area are uniform and rectangular or square.

* * * * *